US010844708B2

(12) United States Patent
Clawson et al.

(10) Patent No.: US 10,844,708 B2
(45) Date of Patent: Nov. 24, 2020

(54) ENERGY EFFICIENT METHOD OF RETRIEVING WIRELESS NETWORKED SENSOR DATA

(71) Applicants: Scott W. Clawson, Califon, NJ (US); Mark M. Disko, Glen Gardner, NJ (US); Katie M. Walker, Spring, TX (US)

(72) Inventors: Scott W. Clawson, Califon, NJ (US); Mark M. Disko, Glen Gardner, NJ (US); Katie M. Walker, Spring, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 147 days.

(21) Appl. No.: 16/189,617

(22) Filed: Nov. 13, 2018

(65) Prior Publication Data
US 2019/0186259 A1 Jun. 20, 2019

Related U.S. Application Data

(60) Provisional application No. 62/608,172, filed on Dec. 20, 2017.

(51) Int. Cl.
E21B 47/13 (2012.01)
E21B 47/26 (2012.01)
(Continued)

(52) U.S. Cl.
CPC ............ *E21B 47/13* (2020.05); *E21B 47/017* (2020.05); *E21B 47/07* (2020.05); *E21B 47/14* (2013.01); *E21B 47/16* (2013.01); *E21B 47/26* (2020.05)

(58) Field of Classification Search
None
See application file for complete search history.

(56) References Cited

U.S. PATENT DOCUMENTS

| 3,103,643 A | 9/1963 | Kalbfell | 340/17 |
| 3,205,477 A | 9/1965 | Kalbfell | 340/18 |

(Continued)

FOREIGN PATENT DOCUMENTS

| CN | 102733799 | 6/2014 | ............ E21B 47/16 |
| EP | 0636763 | 2/1995 | ............ E21B 47/12 |

(Continued)

OTHER PUBLICATIONS

U.S. Appl. No. 15/666,334, filed Aug. 1, 2017, Walker, Katie M. et al.

(Continued)

*Primary Examiner* — John F Mortell
(74) *Attorney, Agent, or Firm* — ExxonMobil Upstream Research Company—Law Department

(57) ABSTRACT

A method of communicating in a wireless network. Devices are positioned such that each device communicates with one or more other devices. Some of the devices include one or more sensors. Each device is a node in the wireless network. At one of the devices, values are recorded from the sensors associated therewith. At least some of the devices, one or more recorded values from the sensors associated with said each device, and/or a sensor associated with at least one other device, are processed in accordance with a variable instruction set, to thereby generate a processed dataset. At each device, at least one of recorded values, a processed dataset associated with another device, or a revision to the variable instruction set are received from another device. At least one of the one or more recorded values, and one or more processed datasets, are transmitted at each device to another device.

17 Claims, 9 Drawing Sheets

(51) Int. Cl.
  *E21B 47/14* (2006.01)
  *E21B 47/16* (2006.01)
  *E21B 47/07* (2012.01)
  *E21B 47/017* (2012.01)

(56) References Cited

U.S. PATENT DOCUMENTS

| | | | |
|---|---|---|---|
| 3,512,407 A | 5/1970 | Zill | 73/152 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Petersen et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,745,012 B1 | 6/2004 | That Dao et al. | |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |

(56) References Cited

U.S. PATENT DOCUMENTS

| | | | |
|---|---|---|---|
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0180613 A1 | 12/2002 | Shi et al. | E21B 47/18 |
| 2002/0196743 A1 | 12/2002 | Sebastian et al. | |
| 2003/0056953 A1 | 3/2003 | Tumlin et al. | 166/298 |
| 2003/0067940 A1 | 4/2003 | Edholm | |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2006/0187755 A1 | 8/2006 | Tingley | |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0254604 A1 | 11/2007 | Kim | 455/88 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0008275 A1* | 1/2010 | Lee | H04J 3/0658 370/311 |
| 2010/0013663 A1 | 1/2010 | Cavender et al. | 340/854.3 |
| 2010/0089141 A1 | 4/2010 | Rioufol et al. | 73/152.28 |
| 2010/0112631 A1 | 5/2010 | Hur et al. | 435/39 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0137614 A1* | 6/2011 | Wheeler | H04L 67/12 702/188 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0278432 A1 | 10/2013 | Shashoua et al. | 340/853.7 |
| 2013/0319102 A1 | 12/2013 | Ringgenberg et al. | 73/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |

(56) References Cited

U.S. PATENT DOCUMENTS

| | | | |
|---|---|---|---|
| 2016/0076363 A1 | 3/2016 | Morrow et al. | E21B 47/12 |
| 2016/0109606 A1 | 4/2016 | Market et al. | G01V 1/50 |
| 2016/0215612 A1 | 7/2016 | Morrow | E21B 47/122 |
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1* | 3/2018 | Song | E21B 47/017 |
| 2018/0066490 A1 | 3/2018 | Kjos | E21B 33/035 |
| 2018/0066510 A1 | 3/2018 | Walker et al. | E21B 47/011 |
| 2019/0112913 A1 | 4/2019 | Song et al. | E21B 47/01 |
| 2019/0112915 A1 | 4/2019 | Disko et al. | E21B 47/14 |
| 2019/0112916 A1 | 4/2019 | Song et al. | E21B 47/14 |
| 2019/0112917 A1 | 4/2019 | Disko et al. | E21B 47/14 |
| 2019/0112918 A1 | 4/2019 | Yi et al. | E21B 4/16 |
| 2019/0112919 A1 | 4/2019 | Song et al. | E21B 47/16 |
| 2019/0116085 A1 | 4/2019 | Zhang et al. | H04L 12/24 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| EP | 2763335 | 8/2014 | H04B 11/00 |
| WO | WO2001/03391 | 1/2001 | |
| WO | WO2002/027139 | 4/2002 | E21B 43/12 |
| WO | WO2004/033852 | 4/2004 | |
| WO | WO2010/074766 | 7/2010 | A41C 1/14 |
| WO | WO2013/079928 | 6/2013 | E21B 47/12 |
| WO | WO2013/162506 | 10/2013 | |
| WO | WO2014/018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/175,441, filed Oct. 30, 2018, Song, Limin et al.
U.S. Appl. No. 16/175,467, filed Oct. 30, 2018, Kinn, Timothy F. et al.
U.S. Appl. No. 16/175,488, filed Oct. 30, 2018, Yi, Xiaohua et al.
U.S. Appl. No. 16/220,327, filed Dec. 14, 2018, Disko, Mark M. et al.
U.S. Appl. No. 16/220,332, filed Dec. 14, 2018, Yi, Xiaohua et al.
U.S. Appl. No. 16/269,083, filed Feb. 6, 2019, Zhang, Yibing.
U.S. Appl. No. 16/267,950, filed Feb. 5, 2019, Walker, Katie M. et al.
U.S. Appl. No. 62/782,153, filed Dec. 19, 2019, Yi, Xiaohua et al.
U.S. Appl. No. 62/782,160, filed Dec. 19, 2018, Hall, Timothy J. et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data In The Indirect Dimension", pp. 8888-8909.
U.S. Department of Defense (1999) "Interoperability and Performance Standards for Medium and High Frequency Radio Systems," *MIL-STD-188-141B*, Mar. 1, 1999, 584 pages.
U.S. Appl. No. 16/139,414, filed Sep. 24, 2018, Zhang, Yibing et al.
U.S. Appl. No. 16/139,427, filed Sep. 24, 2018, Disko, Mark M. et al.
U.S. Appl. No. 16/139,384, filed Sep. 24, 2018, Disko, Mark M. et al.
U.S. Appl. No. 16/139,421, filed Sep. 24, 2018, Song, Limin et al.

* cited by examiner

```
// Example trigger instructing that all sensor devices
// at 600-1200 foot depth downhole should save a
// temperature reading in their log every 10 minutes trigger TEMPERATURE
   where DEPTH in (600..1200ft)
      and SAMPLE @ 10min
```
} 902

```
// Example query requesting temperatures from all
// sensor devices at 600-1200 foot depth downhole:
// each sensor device should return the 10-point
// moving average of every 12th temperature from
// 95th through 600th temperature in the log select ma10(TEMPERATURE)
   where DEPTH in (600..1200ft)
      and SAMPLE in (96..600)
      and SAMPLE % 12 == 0
```
} 904

```
// Example query requesting temperatures from all
// sensor devices at 600-1200 foot depth downhole:
// each sensor device should return the 10-point
// moving average of every 12th temperature from
// the log, but only when it exceeds the previous
// moving average value by more than 20% select ma10(TEMPERATURE)
   where DEPTH in (600..1200ft)
      and SAMPLE % 12 == 0
   when VALUE[0] / VALUE[-1] > 1.20
```
} 906

*FIG. 9*

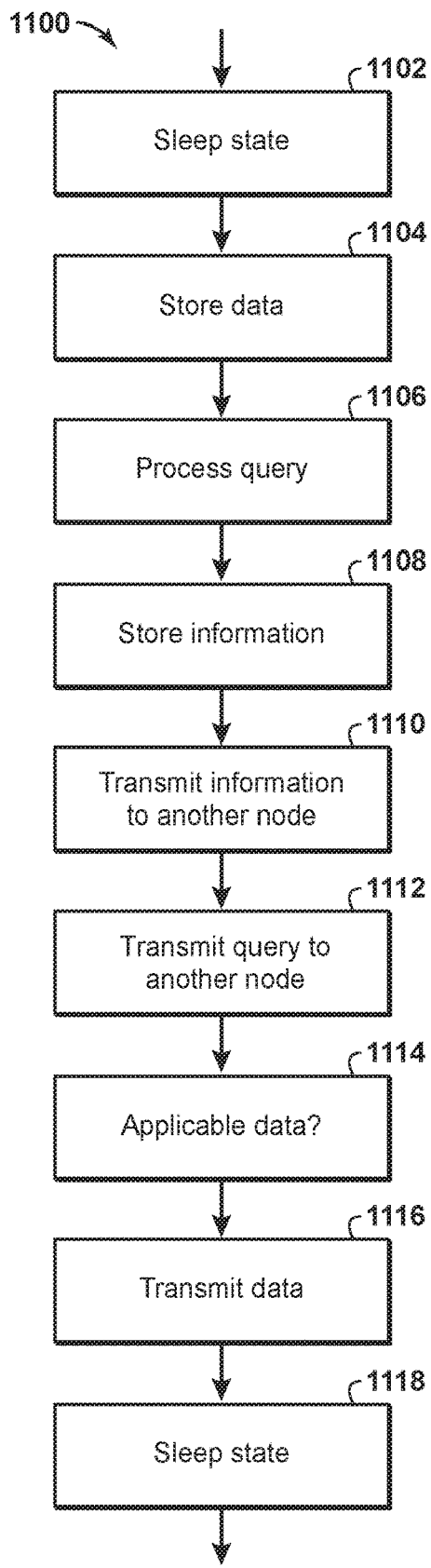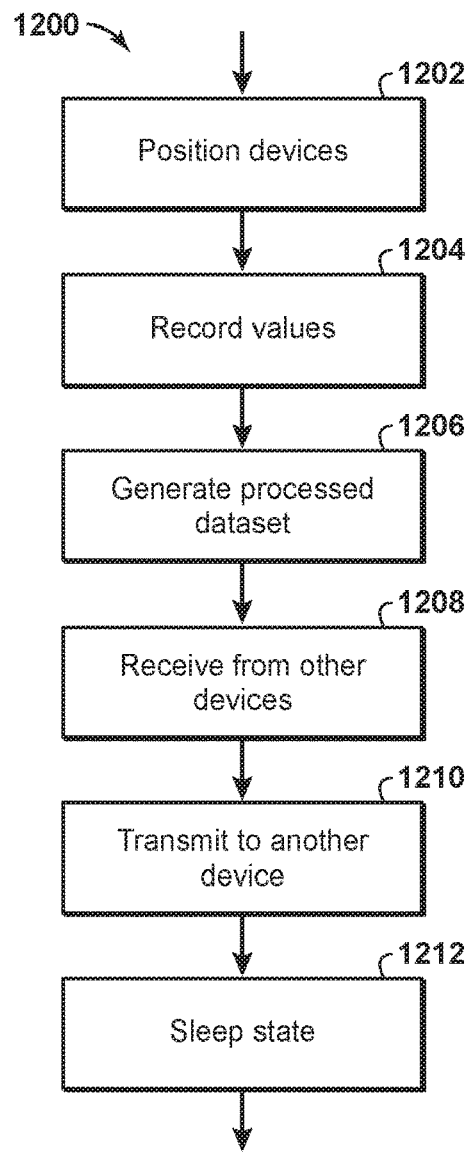
FIG. 11
FIG. 12

ENERGY EFFICIENT METHOD OF RETRIEVING WIRELESS NETWORKED SENSOR DATA

CROSS REFERENCE TO RELATED APPLICATION

This application claims the priority benefit of U.S. Provisional Application No. 62/608,172, filed Dec. 20, 2017 entitled ENERGY EFFICIENT METHOD OF RETRIEVING WIRELESS NETWORKED SENSOR DATA, the disclosure of which is incorporated herein by reference in its entirety.

This application is related to U.S. patent application Ser. No. 15/665,952, filed Aug. 1, 2017 entitled PLUNGER LIFT MONITORING VIA A DOWNHOLE WIRELESS NETWORK FIELD; U.S. patent application Ser. No. 16/139,414, filed Sep. 24, 2018 entitled METHOD AND SYSTEM FOR PERFORMING OPERATIONS USING COMMUNICATIONS; U.S. patent application Ser. No. 16/139,427, filed Sep. 24, 2018 entitled METHOD AND SYSTEM FOR PERFORMING OPERATIONS WITH COMMUNICATIONS; U.S. patent application Ser. No. 16/139,384, filed Sep. 24, 2018 entitled METHOD AND SYSTEM FOR PERFORMING HYDROCARBON OPERATIONS WITH MIXED COMMUNICATION NETWORKS and U.S. patent application Ser. No. 16/139,421, filed Sep. 24, 2018 entitled METHOD AND SYSTEM FOR PERFORMING WIRELESS ULTRASONIC COMMUNICATIONS ALONG A DRILLING STRING, the disclosures of which are incorporated herein by reference in their entirety.

FIELD

The present disclosure relates generally to the field of data transmission along a tubular body, such as a steel pipe. More specifically, the present disclosure relates to the transmission of data along a pipe within a wellbore or along a pipeline, whether at the surface, underground, or in a body of water.

BACKGROUND

In the oil and gas industry, it is desirable to obtain data from a wellbore. Several real time data systems have been proposed. One involves the use of a physical cable such as an electrical conductor or a fiber optic cable that is secured to the tubular body. The cable may be secured to either the inner or the outer diameter of the pipe. The cable provides a hard wire connection that allows for real-time transmission of data and the immediate evaluation of subsurface conditions. Further, these cables allow for high data transmission rates and the delivery of electrical power directly to downhole sensors. However, use of physical cables may be difficult as the cables have to be unspooled and attached to the pipe sections disposed within a wellbore. Accordingly, the pipes being installed into the well may not be rotated because of the attached cables, which may be broken through such installations. This limitation may be problematic for installations into horizontal wells, which typically involve rotating the pipes. These passages for the cables provide potential locations for leakage of fluids, which may be more problematic for configurations that involve high pressure fluids. In addition, the leakage of down-hole fluids may increase the risk of cement seal failures. Further, the use of cables in a well completion requires installing a specially-designed well head that includes through-openings for the wires.

Various wireless technologies have been proposed or developed for downhole communications. Such technologies are referred to in the industry as telemetry. Several examples exist where the installation of wires may be either technically difficult or economically impractical. The use of radio transmission may also be impractical or unavailable in cases where radio-activated blasting is occurring, or where the attenuation of radio waves near the tubular body is significant.

The use of acoustic telemetry has also been suggested. Acoustic telemetry utilizes an acoustic wireless network to wirelessly transmit an acoustic signal, such as a vibration, via a tone transmission medium. The tone transmission medium may comprise one or more of a pipe, fluid in the pipe, a tubular element inside or outside the pipe, or the geologic formation surrounding the pipe. In general, a given tone transmission medium may only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length thereof. Transmitted acoustic signals are detected by a receiver and converted to electrical signals for analysis.

Advancements in semiconductor manufacturing and wireless networking have made possible a proliferation of sensor devices that target a variety of industrial applications, including the oil and gas industry in general and downhole wells (hydrocarbon and injection) specifically. The availability of a rich assortment of real time (or nearly so) sensor information enables advanced analytics that in turn can offer efficiencies in installation, stimulation, and production of these assets. Given its high potential value, the trend toward sensor proliferation will continue.

Sensors typically need to be present in remote locations such as within or near a reservoir deep underground or beneath a body of water (which may both be considered "downhole" for the purposes of this disclosure). Because the sensor is likely irretrievable once installed, it must incorporate its own power supply, usually a battery and less commonly some form of energy harvesting. State-of-the-art sensor devices address these requirements by minimizing power consumption, in part by existing mostly in a low power sleep state, waking occasionally just long enough to take a reading and transmit in a minimally-sufficient format to a nearby listener. The lower the rate of power consumption, the longer the operational life downhole.

Acoustic wireless data transmission is also costly from an energy consumption standpoint, and network deployment on a practical scale exacerbates this. A typical network might include 100+ sensors distributed along a 6,000+ foot vertical or horizontal tubular. Latency, data rate, acoustic channel capacity, and network complexity (which is proportional to the number of sensor devices) collectively work to limit both quantity and type of retrievable data, constraining the analytical value of the network. Any attempt to retrieve enough downhole sensor data to increase analytical value will significantly decrease network scalability and reduce operational life. This therefore serves as an impediment to realizing the full return on investment of instrumenting a downhole asset with sensors. One might work around this by means of larger batteries as a way of forcing a higher analytical value dataset through the network while maintaining operational life. However, a larger battery would increase the physical size of each sensor device, each of which includes its own power source, and preclude use in space-constrained locations, which in turn would reduce the network's value. This is particularly true in that batteries compatible with the extreme temperatures and pressures common downhole tend to offer lower volumetric capacity.

Another alternative is to run wiring to each downhole sensor device for power and fast data transfer, but this would also be problematic because each wire creates a continuous path through cement to the surface, increasing the risk of a blowout or other unsafe event from a leak path around the wire or in weakened cement. Additionally, the voltage drop over a long wire would be excessive and get rapidly worse as current flow increases. A wire would be a single point of failure for data transfer, increasing risk of a severed network. Lastly, installing downhole wiring is particularly labor intensive and would increase the risk of a failed installation.

The above considerations leave an undesirable choice: lose most of the benefits of state-of-the-art downhole sensors, forego instrumentation in space-constrained downhole locations, or accept a short operational life for the sensors. Accordingly, a need exists for a wireless communication network having extended operational life. Additionally, a need exists for a wireless communication network that is suitable for use in a downhole environment.

SUMMARY

In one aspect, a method is provided for communication in a wireless network having a plurality of nodes including a first node. Each of the plurality of nodes is maintained in a sleep state, which may include a low-power state. If a trigger event occurs at the first node, data relevant to the trigger event may be sensed and/or stored and/or indexed at the first node. If a query applicable to the first node is received by the first node, the query is processed at the first node to produce query-based information. The query-based information is stored at the first node until the processing of the query is complete. The query-based information is transmitted to another node in the network. If the query may have applicability to a node other than the first node, the query is transmitted to another node in the network. If data is received by the first node, it is determined whether the data is needed to process a query applicable to the first node. If the data is not needed to process the query, the data may be transmitted to another of the plurality of nodes. The first node is returned to the sleep state when the query-based information or the data is transmitted.

In another aspect, a communications network is provided. The network includes a plurality of devices positioned to communicate with one or more other of the plurality of devices. At least some of the devices include one or more sensors and a means to record values from the one or more sensors. At least some of the devices include a processor configured to process one or more recorded values from (i) the one or more sensors associated with said each device, and/or (ii) a sensor associated with at least one other device, in accordance with a variable instruction set, to thereby generate a processed dataset. Each device includes a receiver configured to receive, from another of the plurality of devices, at least one of recorded values, a processed dataset associated with another of the plurality of devices, or a revision to the variable instruction set. Each device includes a transmitter configured to transmit at least one of the one or more recorded values, and one or more processed datasets, to another of the plurality of devices. Each device is maintained in a sleep state unless instructions are received to record values, process the recorded values, and/or transmit to another device, and each device returns to the sleep state when the instructions are fulfilled.

In yet another aspect, a method of communicating in a wireless network is provided. A plurality of devices are positioned such that each device communicates with one or more other devices. At least some of the devices include one or more sensors. At one or more of the devices, values from the one or more sensors associated therewith are recorded. At least some of the devices, one or more recorded values from the one or more sensors associated with said each device, and/or a sensor associated with at least one other device, are processed in accordance with a variable instruction set, to thereby generate a processed dataset. At each device, at least one of recorded values, a processed dataset associated with another of the devices, or a revision to the variable instruction set is received from another of the devices. At each device, at least one of the one or more recorded values, and one or more processed datasets, is transmitted to another of the devices. Each device is maintained in a sleep state unless instructions are received to record values, process the recorded values, and/or transmit to another device, and each device returns to the sleep state when the instructions are fulfilled.

DESCRIPTION OF THE DRAWINGS

The present disclosure is susceptible to various modifications and alternative forms, specific exemplary implementations thereof have been shown in the drawings and are herein described in detail. It should be understood, however, that the description herein of specific exemplary implementations is not intended to limit the disclosure to the particular forms disclosed herein. This disclosure is to cover all modifications and equivalents as defined by the appended claims. It should also be understood that the drawings are not necessarily to scale, emphasis instead being placed upon clearly illustrating principles of exemplary embodiments of the present invention. Moreover, certain dimensions may be exaggerated to help visually convey such principles. Further where considered appropriate, reference numerals may be repeated among the drawings to indicate corresponding or analogous elements. Moreover, two or more blocks or elements depicted as distinct or separate in the drawings may be combined into a single functional block or element. Similarly, a single block or element illustrated in the drawings may be implemented as multiple steps or by multiple elements in cooperation. The forms disclosed herein are illustrated by way of example, and not by way of limitation, in the figures of the accompanying drawings and in which like reference numerals refer to similar elements and in which:

FIG. 9 is a printout showing non-limiting examples of a trigger and two queries, according to disclosed aspects.

FIG. 11 is a flowchart of a method according to disclosed aspects.

FIG. 12 is a flowchart of a method according to disclosed aspects.

DETAILED DESCRIPTION

Terminology

Figure 1:
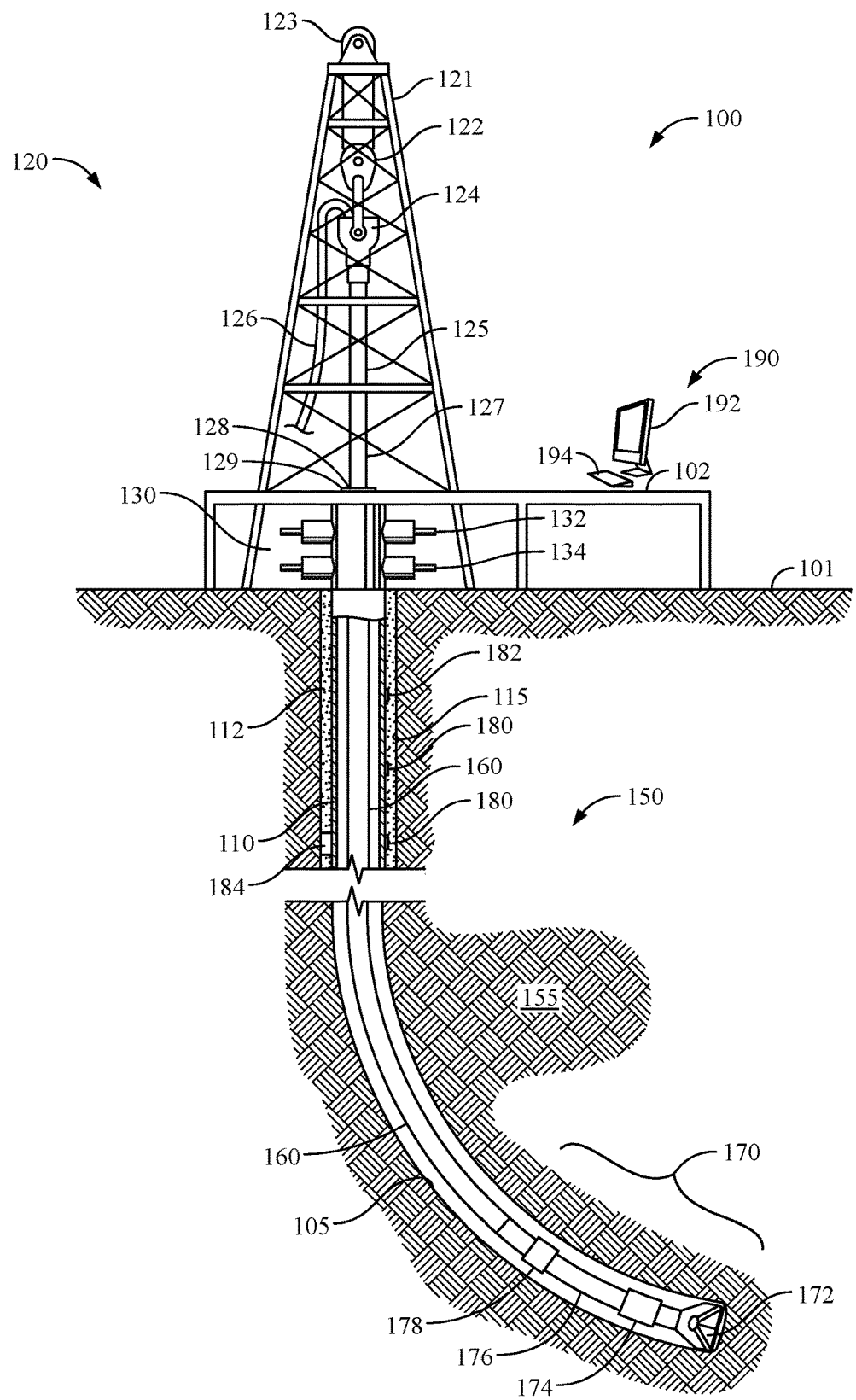
FIG. 1 presents a side, cross-sectional view of an illustrative, nonexclusive example of a wellbore. The wellbore is being formed using a derrick, a drill string and a bottom hole assembly. A series of communications nodes is placed along the drill string as part of a telemetry system, according to the present disclosure.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than the broadest meaning understood by skilled artisans, such a special or clarifying definition will be expressly set forth in the specification in a definitional manner that provides the special or clarifying definition for the term or phrase.

For example, the following discussion contains a non-exhaustive list of definitions of several specific terms used in this disclosure (other terms may be defined or clarified in a definitional manner elsewhere herein). These definitions are intended to clarify the meanings of the terms used herein. It is believed that the terms are used in a manner consistent with their ordinary meaning, but the definitions are nonetheless specified here for clarity.

A/an: The articles "a" and "an" as used herein mean one or more when applied to any feature in embodiments and implementations of the present invention described in the specification and claims. The use of "a" and "an" does not limit the meaning to a single feature unless such a limit is specifically stated. The term "a" or "an" entity refers to one or more of that entity. As such, the terms "a" (or "an"), "one or more" and "at least one" can be used interchangeably herein.

About: As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Above/below: In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

And/or: The term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

Any: The adjective "any" means one, some, or all indiscriminately of whatever quantity.

At least: As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Based on: "Based on" does not mean "based only on", unless expressly specified otherwise. In other words, the phrase "based on" describes both "based only on," "based at least on," and "based at least in part on."

Comprising: In the claims, as well as in the specification, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Couple: Any use of any form of the terms "connect", "engage", "couple", "attach", or any other term describing an interaction between elements is not meant to limit the interaction to direct interaction between the elements and may also include indirect interaction between the elements described.

Determining: "Determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

Embodiments: Reference throughout the specification to "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

Exemplary: "Exemplary" is used exclusively herein to mean "serving as an example, instance, or illustration." Any embodiment described herein as "exemplary" is not necessarily to be construed as preferred or advantageous over other embodiments.

Flow diagram: Exemplary methods may be better appreciated with reference to flow diagrams or flow charts. While for purposes of simplicity of explanation, the illustrated methods are shown and described as a series of blocks, it is to be appreciated that the methods are not limited by the order of the blocks, as in different embodiments some blocks may occur in different orders and/or concurrently with other blocks from that shown and described. Moreover, less than all the illustrated blocks may be required to implement an exemplary method. In some examples, blocks may be combined, may be separated into multiple components, may employ additional blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in series, and/or at substantially different points in time. In some examples, methods may be implemented as processor executable instructions. Thus, a machine-readable medium may store processor executable instructions that if executed by a machine (e.g., processor) cause the machine to perform a method.

May: Note that the word "may" is used throughout this application in a permissive sense (i.e., having the potential to, being able to), not a mandatory sense (i.e., must).

Operatively connected and/or coupled: Operatively connected and/or coupled means directly or indirectly connected for transmitting or conducting information, force, energy, or matter.

Optimizing: The terms "optimal," "optimizing," "optimize," "optimality," "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

Order of steps: It should also be understood that, unless clearly indicated to the contrary, in any methods claimed herein that include more than one step or act, the order of the steps or acts of the method is not necessarily limited to the order in which the steps or acts of the method are recited.

Ranges: Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, the term "formation" refers to any definable subsurface region. The formation may contain one or more hydrocarbon-containing layers, one or more non-hydrocarbon containing layers, an overburden, and/or an underburden of any geologic formation.

As used herein, the term "hydrocarbon" refers to an organic compound that includes primarily, if not exclusively, the elements hydrogen and carbon. Examples of hydrocarbons include any form of natural gas, oil, coal, and bitumen that can be used as a fuel or upgraded into a fuel.

As used herein, the term "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° C. and 1 atm pressure). Hydrocarbon fluids may include, for example, oil, natural gas, gas condensates, coal bed methane, shale oil, shale gas, and other hydrocarbons that are in a gaseous or liquid state.

As used herein, the term "potting" refers to the encapsulation of electrical components with epoxy, elastomeric, silicone, or asphaltic or similar compounds for the purpose of excluding moisture or vapors. Potted components may or may not be hermetically sealed.

As used herein, the term "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, the term "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, the term "subsurface" refers to geologic strata occurring below the earth's surface.

The terms "tubular member" or "tubular body" refer to any pipe, such as a joint of casing, a portion of a liner, a drill string, a production tubing, an injection tubing, a pup joint, a buried pipeline, underwater piping, or above-ground piping, solid lines therein, and any suitable number of such structures and/or features may be omitted from a given embodiment without departing from the scope of the present disclosure.

As used herein, the term "wellbore" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

The terms "zone" or "zone of interest" refer to a portion of a subsurface formation containing hydrocarbons. The term "hydrocarbon-bearing formation" may alternatively be used.

Description

Specific forms will now be described further by way of example. While the following examples demonstrate certain forms of the subject matter disclosed herein, they are not to be interpreted as limiting the scope thereof, but rather as contributing to a complete description.

FIG. 1 is a side, cross-sectional view of an illustrative well site 100. The well site 100 includes a derrick 120 at an earth surface 101. The well site 100 also includes a wellbore 150 extending from the earth surface 101 and down into an earth subsurface 155. The wellbore 150 is being formed using the derrick 120, a drill string 160 below the derrick 120, and a bottom hole assembly 170 at a lower end of the drill string 160.

Referring first to the derrick 120, the derrick 120 includes a frame structure 121 that extends up from the earth surface 101. The derrick 120 supports drilling equipment including a traveling block 122, a crown block 123 and a swivel 124. A so-called kelly 125 is attached to the swivel 124. The kelly 125 has a longitudinally extending bore (not shown) in fluid communication with a kelly hose 126. The kelly hose 126, also known as a mud hose, is a flexible, steel-reinforced, high-pressure hose that delivers drilling fluid through the bore of the kelly 125 and down into the drill string 160.

The kelly 125 includes a drive section 127. The drive section 127 is non-circular in cross-section and conforms to an opening 128 longitudinally extending through a kelly drive bushing 129. The kelly drive bushing 129 is part of a rotary table. The rotary table is a mechanically driven device that provides clockwise (as viewed from above) rotational force to the kelly 125 and connected drill string 160 to facilitate the process of drilling a borehole 105. Both linear and rotational movement may thus be imparted from the kelly 125 to the drill string 160.

A platform 102 is provided for the derrick 120. The platform 102 extends above the earth surface 101. The platform 102 generally supports rig hands along with various components of drilling equipment such as pumps, motors, gauges, a dope bucket, tongs, pipe lifting equipment and control equipment. The platform 102 also supports the rotary table.

It is understood that the platform 102 shown in FIG. 1 is somewhat schematic. It is also understood that the platform 102 is merely illustrative and that many designs for drilling rigs and platforms, both for onshore and for offshore operations, exist. These include, for example, top drive drilling systems. The claims provided herein are not limited by the configuration and features of the drilling rig unless expressly stated in the claims.

Placed below the platform 102 and the kelly drive section 127 but above the earth surface 101 is a blowout preventer, or BOP 130. The BOP 130 is a large, specialized valve or set of valves used to control pressures during the drilling of oil and gas wells. Specifically, blowout preventers control the fluctuating pressures emanating from subterranean formations during a drilling process. The BOP 130 may include upper 132 and lower 134 rams used to isolate flow on the back side of the drill string 160. Blowout preventers 130 also prevent the pipe joints making up the drill string 160 and the drilling fluid from being blown out of the wellbore 150 in the event of a sudden pressure kick.

As shown in FIG. 1, the wellbore 150 is being formed down into the subsurface formation 155. In addition, the wellbore 150 is being shown as a deviated wellbore. Of course, this is merely illustrative as the wellbore 150 may be a vertical well or even a horizontal well, as shown later in FIG. 2.

In drilling the wellbore 150, a first string of casing 110 is placed down from the surface 101. This is known as surface casing 110 or, in some instances (particularly offshore), conductor pipe. The surface casing 110 is secured within the formation 155 by a cement sheath 112. The cement sheath 112 resides within an annular region 115 between the surface casing 110 and the surrounding formation 155.

During the process of drilling and completing the wellbore 150, additional strings of casing (not shown) will be provided. These may include intermediate casing strings and a final production casing string. For an intermediate case string or the final production casing, a liner may be employed, that is, a string of casing that is not tied back to the surface 101.

As noted, the wellbore 150 is formed by using a bottom hole assembly 170. The bottom hole assembly 170 allows the operator to control or "steer" the direction or orientation of the wellbore 150 as it is formed. In this instance, the bottom hole assembly 170 is known as a rotary steerable drilling system, or RSS.

The bottom hole assembly 170 will include a drill bit 172. The drill bit 172 may be turned by rotating the drill string 160 from the platform 102. Alternatively, the drill bit 172 may be turned by using so-called mud motors 174. The mud motors 174 are mechanically coupled to and turn the nearby drill bit 172. The mud motors 174 are used with stabilizers or bent subs 176 to impart an angular deviation to the drill bit 172. This, in turn, deviates the well from its previous path in the desired azimuth and inclination.

There are several advantages to directional drilling. These primarily include the ability to complete a wellbore along a substantially horizontal axis of a subsurface formation, thereby exposing a greater formation face. These also include the ability to penetrate into subsurface formations that are not located directly below the wellhead. This is particularly beneficial where an oil reservoir is located under an urban area or under a large body of water. Another benefit of directional drilling is the ability to group multiple wellheads on a single platform, such as for offshore drilling. Finally, directional drilling enables multiple laterals and/or sidetracks to be drilled from a single wellbore in order to maximize reservoir exposure and recovery of hydrocarbons.

The illustrative well site 100 also includes a sensor 178. In some embodiments, the sensor 178 is part of the bottom hole assembly 170. The sensor 178 may be, for example, a set of position sensors that is part of the electronics for an RSS. Alternatively or in addition, the sensor 178 may be a temperature sensor, a pressure sensor, or other sensor for detecting a downhole condition during drilling. Alternatively still, the sensor may be an induction log or gamma ray log or other log that detects fluid and/or geology downhole.

The sensor 178 may be part of a MWD or a LWD assembly. It is observed that the sensor 178 is located above the mud motors 174. This is a common practice for MWD assemblies. This allows the electronic components of the sensor 178 to be spaced apart from the high vibration and centrifugal forces acting on the bit 172.

Where the sensor 178 is a set of position sensors, the sensors may include three inclinometer sensors and three environmental acceleration sensors. Ideally, a temperature sensor and a wear sensor will also be placed in the drill bit 172. These signals are input into a multiplexer and transmitted.

As the wellbore 150 is being formed, the operator may wish to evaluate the integrity of the cement sheath 112 placed around the surface casing 110 (or other casing string). To do this, the industry has relied upon so-called cement bond logs. As discussed above, a cement bond log (or CBL), uses an acoustic signal that is transmitted by a logging tool at the end of a wireline. The logging tool includes a transmitter, and one or more receivers that "listen" for sound waves generated by the transmitter through the surrounding casing string. The logging tool includes a signal processor that takes a continuous measurement of the amplitude of sound pulses from the transmitter to the receiver. Alternately, the attenuation of the sonic signal may be measured.

In some instances, a bond log will measure acoustic impedance of the material in the annulus directly behind the casing. This may be done through resonant frequency decay. Such logs include, for example, the USIT log of Schlumberger (of Sugar Land, Tex.) and the CAST-V log of Halliburton (of Houston, Tex.).

It is desirable to implement a downhole telemetry system that enables the operator to evaluate cement sheath integrity without need of running a CBL line. This enables the operator to check cement sheath integrity as soon as the cement has set in the annular region 115 or as soon as the wellbore 150 is completed. Additionally or alternatively, one or more sensors (not shown) may be deployed downhole to monitor a wide variety of properties, including, but not limited to, fluid characteristics, temperature, depth, etc., as those skilled in the art will plainly understand.

To do this, the well site 100 includes a plurality of battery-powered intermediate communications nodes 180. The battery-powered intermediate communications nodes 180 are placed along the outer surface of the surface casing 110 according to a pre-designated spacing. The battery-powered intermediate communications nodes 180 are configured to receive and then relay acoustic signals along the length of the wellbore 150 in node-to-node arrangement up to the topside communications node 182. The topside communications node 182 is placed closest to the surface 101. The topside communications node 182 is configured to receive acoustic signals and convert them to electrical or optical signals. The topside communications node 182 may be above grade or below grade.

The nodes may also include a sensor communications node 184. The sensor communications node is placed closest to the sensor 178. The sensor communications node 184 is configured to communicate with the downhole sensor 178, and then send a wireless signal using an acoustic wave.

The well site 100 of FIG. 1 also shows a receiver 190. The receiver 190 comprises a processor 192 that receives signals sent from the topside communications node 182. The signals may be received through a wire (not shown) such as a co-axial cable, a fiber optic cable, a USB cable, or other electrical or optical communications wire. Alternatively, the receiver 190 may receive the final signals from the topside communications node 182 wirelessly through a modem, a transceiver or other wireless communications link such as Bluetooth or Wi-Fi. The receiver 190 preferably receives electrical signals via a so-called Class I, Division I conduit, that is, a housing for wiring that is considered acceptably safe in an explosive environment. In some applications, radio, infrared or microwave signals may be utilized.

The processor 192 may include discrete logic, any of various integrated circuit logic types, or a microprocessor. In any event, the processor 192 may be incorporated into a computer having a screen. The computer may have a separate keyboard 194, as is typical for a desk-top computer, or an integral keyboard as is typical for a laptop or a personal digital assistant. In one aspect, the processor 192 is part of a multi-purpose "smart phone" having specific "apps" and wireless connectivity.

As indicated, the intermediate communications nodes 180 of the downhole telemetry system are powered by batteries and, as such, system energy limitations can be encountered. While the useful life of the network can be extended by placing the nodes into a "sleep" mode when data collection and communication are not needed; heretofore, there have been no methods available to awaken the intermediate communications nodes 180 when data acquisition is required. Thus, prior to the systems and methods of the present disclosure, the downhole telemetry system was always in the active state; consequently, the life of the network was limited to months, not years.

As has been described hereinabove, FIG. 1 illustrates the use of a wireless data telemetry system during a drilling operation. As may be appreciated, the wireless telemetry system may also be employed after a well is completed. In any event, the wireless data telemetry system shown in the Figures and described herein may be described as having a substantially linear network topology because it generally follows the linear path of a drill string, casing string, wellbore, pipeline, or the like. Such a substantially linear network topology may include multiple drill strings, wellbores, or pipelines, or portions thereof (such as deviations or lateral sections of a wellbore) operationally connected at one or more points.

Figure 2:
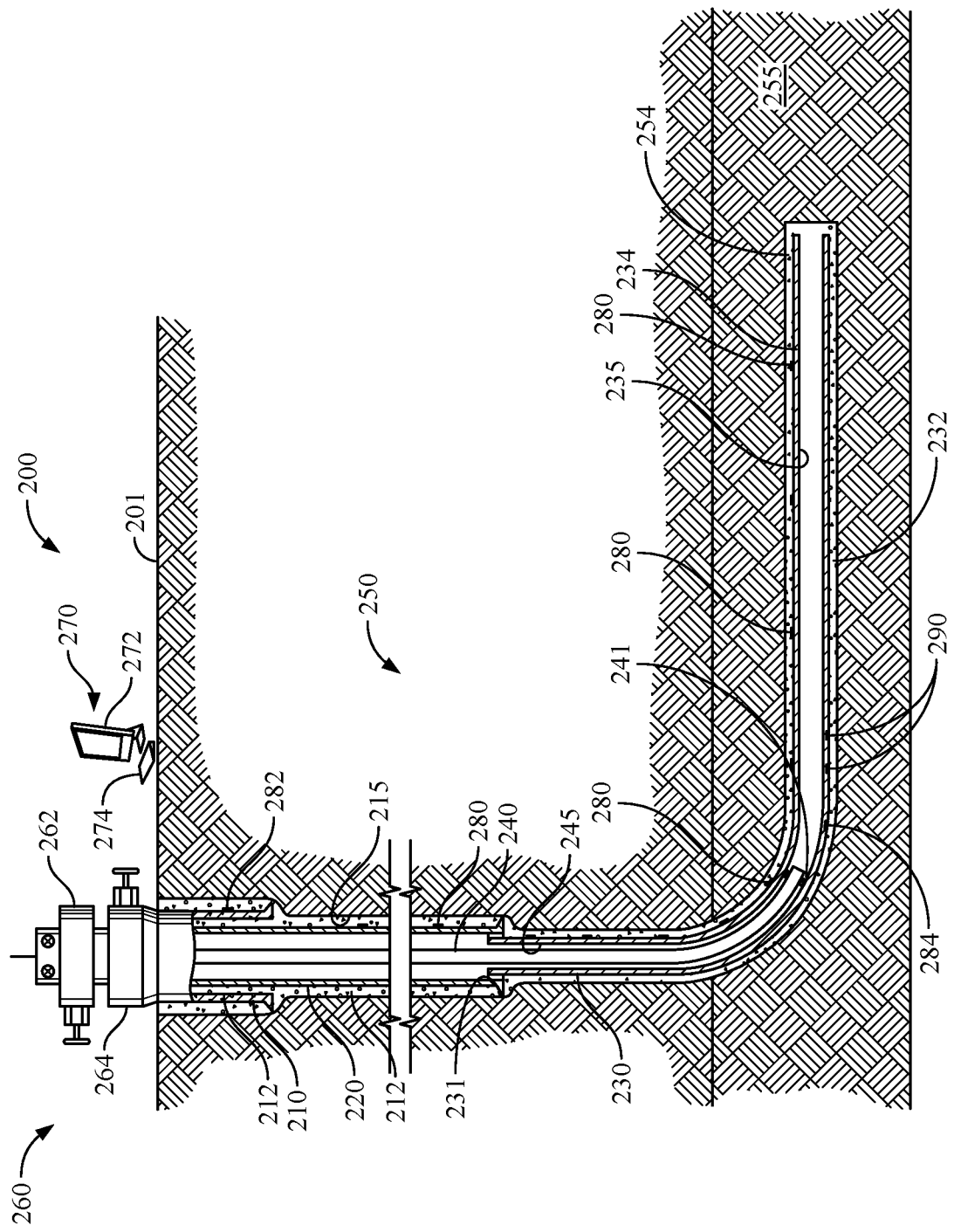
FIG. 2 presents a cross-sectional view of an illustrative, nonexclusive example of a wellbore having been completed. The illustrative wellbore has been completed as a cased hole completion. A series of communications nodes is placed along the casing string as part of a telemetry system, according to the present disclosure.

FIG. 2 is a cross-sectional view of an illustrative well site 200. The well site 200 includes a wellbore 250 that penetrates into a subsurface formation 255. The wellbore 250 has been completed as a cased-hole completion for producing hydrocarbon fluids. The well site 200 also includes a well head 260. The well head 260 is positioned at an earth surface 201 to control and direct the flow of formation fluids from the subsurface formation 255 to the surface 201.

Referring first to the well head 260, the well head 260 may be any arrangement of pipes or valves that receive reservoir fluids at the top of the well. In the arrangement of FIG. 2, the well head 260 represents a so-called Christmas tree. A Christmas tree is typically used when the subsurface formation 255 has enough in situ pressure to drive production fluids from the formation 255, up the wellbore 250, and to the surface 201. The illustrative well head 260 includes a top valve 262 and a bottom valve 264.

It is understood that rather than using a Christmas tree, the well head 260 may alternatively include a motor (or prime mover) at the surface 201 that drives a pump. The pump, in turn, reciprocates a set of sucker rods and a connected positive displacement pump (not shown) downhole. The pump may be, for example, a rocking beam unit or a hydraulic piston pumping unit. Alternatively still, the well head 260 may be configured to support a string of production tubing having a downhole electric submersible pump, a gas lift valve, or other means of artificial lift (not shown). The present inventions are not limited by the configuration of operating equipment at the surface unless expressly noted in the claims.

Referring next to the wellbore 250, the wellbore 250 has been completed with a series of pipe strings referred to as casing. First, a string of surface casing 210 has been cemented into the formation. Cement is shown in an annular bore 215 of the wellbore 250 around the casing 210. The cement is in the form of an annular sheath 212. The surface casing 210 has an upper end in sealed connection with the lower valve 264.

Next, at least one intermediate string of casing 220 is cemented into the wellbore 250. The intermediate string of casing 220 is in sealed fluid communication with the upper master valve 262. A cement sheath 212 is again shown in a bore 215 of the wellbore 250. The combination of the casing 210/220 and the cement sheath 212 in the bore 215 strengthens the wellbore 250 and facilitates the isolation of formations behind the casing 210/220.

It is understood that a wellbore 250 may, and typically will, include more than one string of intermediate casing. In some instances, an intermediate string of casing may be a liner.

Finally, a production string 230 is provided. The production string 230 is hung from the intermediate casing string 230 using a liner hanger 231. The production string 230 is a liner that is not tied back to the surface 201. In the arrangement of FIG. 2, a cement sheath 232 is provided around the liner 230.

The production liner 230 has a lower end 234 that extends to an end 254 of the wellbore 250. For this reason, the wellbore 250 is said to be completed as a cased-hole well. Those of ordinary skill in the art will understand that for production purposes, the liner 230 may be perforated after cementing to create fluid communication between a bore 235 of the liner 230 and the surrounding rock matrix making up the subsurface formation 255. In one aspect, the production string 230 is not a liner but is a casing string that extends back to the surface.

As an alternative, end 254 of the wellbore 250 may include joints of sand screen (not shown). The use of sand screens with gravel packs allows for greater fluid communication between the bore 235 of the liner 230 and the surrounding rock matrix while still providing support for the wellbore 250. In this instance, the wellbore 250 would include a slotted base pipe as part of the sand screen joints. Of course, the sand screen joints would not be cemented into place and would not include subsurface communications nodes.

The wellbore 250 optionally also includes a string of production tubing 240. The production tubing 240 extends from the well head 260 down to the subsurface formation 255. In the arrangement of FIG. 2, the production tubing 240 terminates proximate an upper end of the subsurface formation 255. A production packer 241 is provided at a lower end of the production tubing 240 to seal off an annular region 245 between the tubing 240 and the surrounding production liner 230. However, the production tubing 240 may extend closer to the end 234 of the liner 230.

In some completions a production tubing 240 is not employed. This may occur, for example, when a monobore is in place.

It is also noted that the bottom end 234 of the production string 230 is completed substantially horizontally within the subsurface formation 255. This is a common orientation for wells that are completed in so-called "tight" or "unconventional" formations. Horizontal completions not only dramatically increase exposure of the wellbore to the producing rock face, but also enables the operator to create fractures that are substantially transverse to the direction of the wellbore. Those of ordinary skill in the art may understand that a rock matrix will generally "part" in a direction that is perpendicular to the direction of least principal stress. For deeper wells, that direction is typically substantially vertical. However, the present inventions have equal utility in vertically completed wells or in multi-lateral deviated wells.

As with the well site 100 of FIG. 1, the well site 200 of FIG. 2 includes a telemetry system that utilizes a series of novel communications nodes. This again may be for the purpose of evaluating the integrity of the cement sheath 212, 232. The communications nodes are placed along the outer diameter of the casing strings 210, 220, 230. These nodes allow for the high speed transmission of wireless signals based on the in situ generation of acoustic waves.

The nodes first include a topside communications node 282. The topside communications node 282 is placed closest to the surface 201. The topside node 282 is configured to receive acoustic signals.

In some embodiments, the nodes may also include a sensor communications node 284. The sensor communications node 284 may be placed near one or more sensors 290. The sensor communications node 284 is configured to communicate with the one or more downhole sensors 290, and then send a wireless signal using acoustic waves.

The sensors 290 may be, for example, pressure sensors, flow meters, or temperature sensors. A pressure sensor may be, for example, a sapphire gauge or a quartz gauge. Sapphire gauges can be used as they are considered more rugged for the high-temperature downhole environment. Alternatively, the sensors may be microphones for detecting ambient noise, or geophones (such as a tri-axial geophone) for detecting the presence of micro-seismic activity. Alternatively still, the sensors may be fluid flow measurement devices such as a spinners, or fluid composition sensors.

In addition, the nodes include a plurality of subsurface battery-powered intermediate communications nodes 280. Each of the subsurface battery-powered intermediate communications nodes 280 is configured to receive and then relay acoustic signals along essentially the length of the wellbore 250. For example, the subsurface battery-powered intermediate communications nodes 280 can utilize two-way electro-acoustic transducers to receive and relay mechanical waves.

The subsurface battery-powered intermediate communications nodes 280 transmit signals as acoustic waves. The acoustic waves can be at a frequency of, for example, between about 50 kHz and 1 MHz. The signals are delivered up to the topside communications node 282 so that signals indicative of cement integrity are sent from node-to-node. A last subsurface battery-powered intermediate communications node 280 transmits the signals acoustically to the topside communications node 282. Communication may be between adjacent nodes or may skip nodes depending on node spacing or communication range. Preferably, communication is routed around nodes which are not functioning properly.

The well site 200 of FIG. 2 shows a receiver 270. The receiver 270 can comprise a processor 272 that receives signals sent from the topside communications node 282. The processor 272 may include discrete logic, any of various integrated circuit logic types, or a microprocessor. The receiver 270 may include a screen and a keyboard 274 (either as a keypad or as part of a touch screen). The receiver 270 may also be an embedded controller with neither a screen nor a keyboard which communicates with a remote computer such as via wireless, cellular modem, or telephone lines.

The signals may be received by the processor 272 through a wire (not shown) such as a co-axial cable, a fiber optic cable, a USB cable, or other electrical or optical communications wire. Alternatively, the receiver 270 may receive the final signals from the topside node 282 wirelessly through a modem or transceiver. The receiver 270 can receive electrical signals via a so-called Class I, Div. 1 conduit, that is, a wiring system or circuitry that is considered acceptably safe in an explosive environment.

FIGS. 1 and 2 present illustrative wellbores 150, 250 that may receive a downhole telemetry system using acoustic transducers. In each of FIGS. 1 and 2, the top of the drawing page is intended to be toward the surface and the bottom of the drawing page toward the well bottom. While wells commonly are completed in substantially vertical orientation, it is understood that wells may also be inclined and even horizontally completed. When the descriptive terms "up" and "down" or "upper" and "lower" or similar terms are used in reference to a drawing, they are intended to indicate location on the drawing page, and not necessarily orientation in the ground, as the present inventions have utility no matter how the wellbore is orientated.

In each of FIGS. 1 and 2, the battery-powered intermediate communications nodes 180, 280 are specially designed to withstand the same corrosive and environmental conditions (for example, high temperature, high pressure) of a wellbore 150 or 250, as the casing strings, drill string, or production tubing. To do so, it is preferred that the battery-powered intermediate communications nodes 180, 280 include sealed steel housings for holding the electronics. In one aspect, the steel material is a corrosion resistant alloy.

Figure 3:
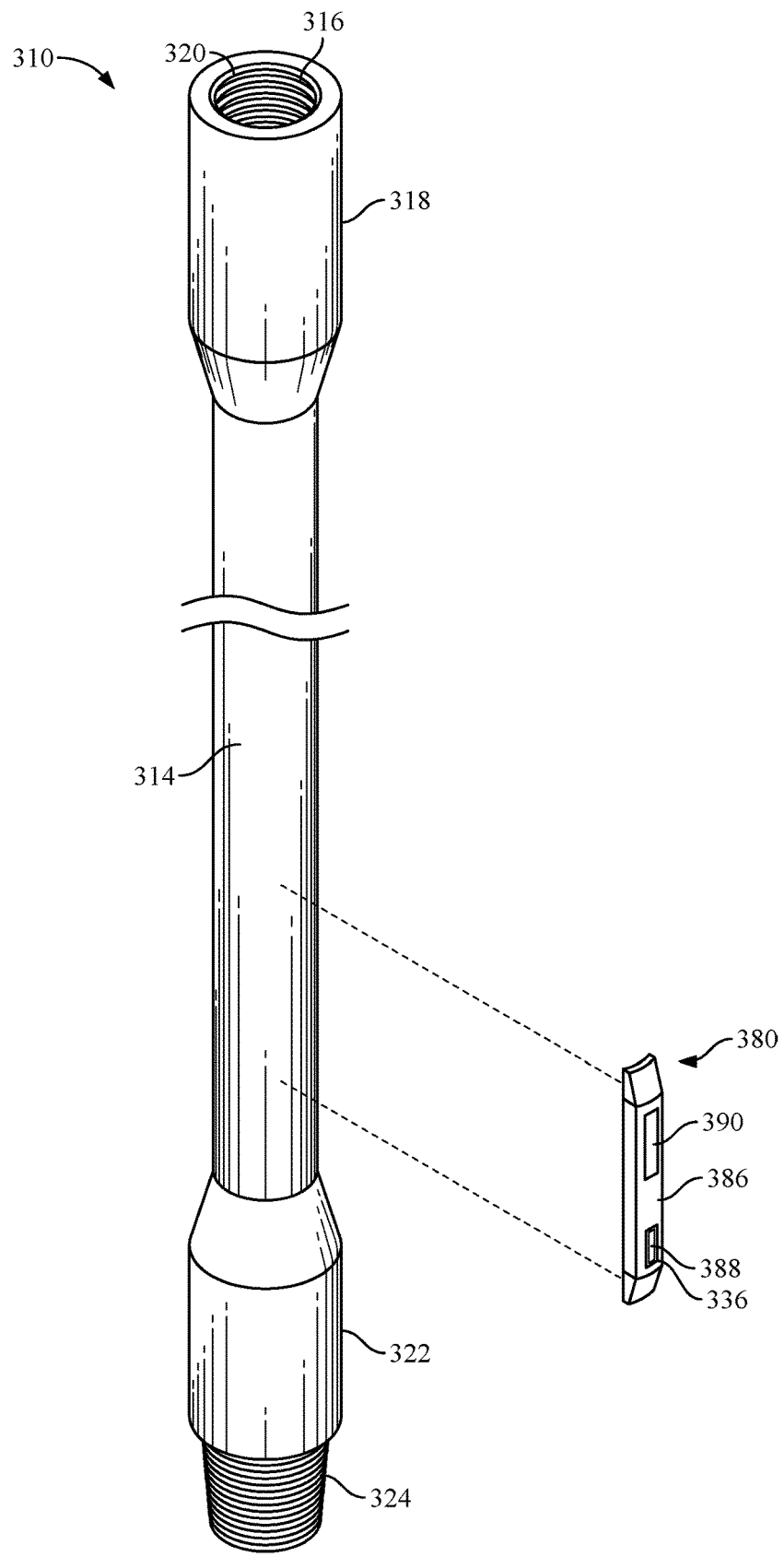
FIG. 3 presents a perspective view of an illustrative tubular section of a downhole wireless telemetry system, in accordance with an embodiment of the disclosure. An intermediate communications node in accordance herewith, is shown in exploded form away from the tubular section.

Referring now to FIG. 3, an enlarged perspective view of an illustrative tubular section 310 of a tubular body, along with an illustrative intermediate communications node 380 is shown. The illustrative intermediate communications node 380 is shown exploded away from the tubular section 310. The tubular section 310 has an elongated wall 314 defining an internal bore 316. The tubular section 310 has a box end 318 having internal threads 320, and a pin end 322 having external threads 324.

As noted, the illustrative intermediate communications node 380 is shown exploded away from the tubular section 310. The intermediate communications node 380 is structured and arranged to attach to the wall 314 of the tubular section 310 at a selected location. In one aspect, selected tubular sections 310 will each have an intermediate communications node 380 between the box end 318 and the pin end 322. In one arrangement, the intermediate communications node 380 is placed immediately adjacent the box end 318 or, alternatively, immediately adjacent the pin end 322 of every tubular section 310. In another arrangement, the intermediate communications node 380 is placed at a selected location along every second or every third tubular section 310. In other aspects, more or less than one intermediate communications node 380 may be placed per tubular section 310.

In some embodiments, the intermediate communications node 380 shown in FIG. 3 is designed to be pre-welded onto the wall 314 of the tubular section 310. In some embodiments, intermediate communications node 380 is configured to be selectively attachable to/detachable from an intermediate by mechanical means at a well 100, 200 (see FIGS. 1-2). This may be done, for example, through the use of clamps (not shown). Alternatively, an epoxy or other suitable acoustic couplant may be used for chemical bonding. In any instance, the intermediate communications node 380 is an independent wireless communications device that is designed to be attached to an external surface of a tubular.

There are benefits to the use of an externally-placed communications node that uses acoustic waves. For example, such a node will not interfere with the flow of fluids within the internal bore 316 of the tubular section 310. Further, installation and mechanical attachment can be readily assessed or adjusted, as necessary.

As shown in FIG. 3, the intermediate communications node 380 includes a housing 386. The housing 386 supports a power source residing within the housing 386, which may be one or more batteries, as shown schematically at 390. The housing 386 also supports a first electro-acoustic transducer, configured to serve as a receiver of acoustic signals and shown schematically at 388, a second electro-acoustic transducer, configured to serve as a transmitter of acoustic signals and shown schematically at 336.

The intermediate communications node 380 is intended to represent the plurality of intermediate communications nodes 180 of FIG. 1, in one embodiment, and the plurality of intermediate communications nodes 280 of FIG. 2, in another embodiment. The first and second electro-acoustic transducers 388 and 336 in each intermediate communications node 380 allow acoustic signals to be sent from node-to-node, either up the wellbore or down the wellbore. Where the tubular section 310 is formed of carbon steel, such as a casing or liner, the housing 386 may be fabricated from carbon steel. This metallurgical match avoids galvanic corrosion at the coupling.

Figure 4:
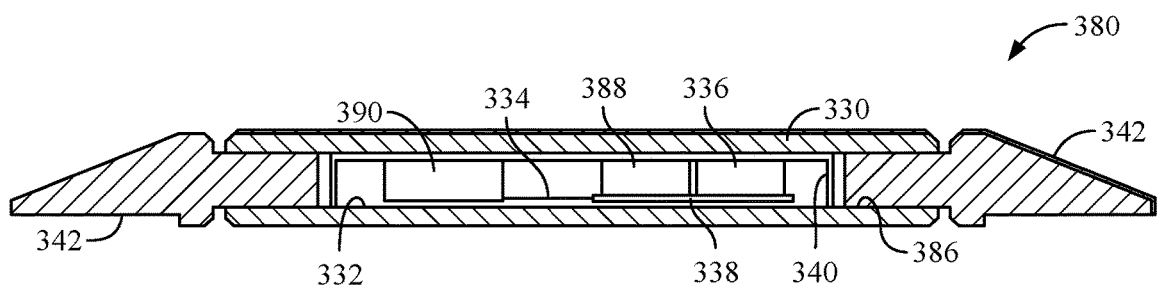
FIG. 4 presents a cross-sectional view of the intermediate communications node of FIG. 3. The view is taken along the longitudinal axis of the intermediate communications node.

FIG. 4 provides a cross-sectional view of the intermediate communications node 380 of FIG. 3. The view is taken along the longitudinal axis of the intermediate communications node 380. The housing 386 is dimensioned to be strong enough to protect internal components and other electronics disposed within the interior region. In one aspect, the housing 386 has an outer wall 330 that may be about 0.2 inches (0.51 cm) in thickness. A cavity 332 houses the electronics, including, by way of example and not of limitation, a power source 390 such as a battery, a power harvesting device, or the like, a power supply wire 334, a first electro-acoustic transducer 388, a second electro-acoustic transducer 336, and a circuit board 338. The circuit board 338 will preferably include a micro-processor or electronics module that processes acoustic signals. The first electro-acoustic transducer 388, and the second electro-acoustic transducer 336 are provided to convert acoustical energy to electrical energy (or vice-versa) and are coupled with outer wall 330 on the side attached to the tubular body.

In some embodiments, the second electro-acoustic transducer 336, configured to serve as a transmitter, of intermediate communications nodes 380 may also produce acoustic telemetry signals. In some embodiments, an electrical signal is delivered to the second electro-acoustic transducer 336, such as through a driver circuit. In some embodiments, the acoustic waves represent asynchronous packets of information comprising a plurality of separate tones.

In some embodiments, the acoustic telemetry data transfer is accomplished using multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, a band pass filter.

The signal generated by the second electro-acoustic transducer 336 then passes through the housing 386 to the tubular body 310, and propagates along the tubular body 310 to other intermediate communications nodes 380. In one aspect, the acoustic signal is generated (first electro-acoustic transducer 388) and/or received (second electro-acoustic transducer 336) by a magnetostrictive transducer comprising a coil wrapped around a core. In another aspect, the acoustic signal is generated and/or received by a piezoelectric ceramic transducer. In either case, the electrically encoded data are transformed into a sonic wave that is carried through the wall 314 of the tubular body 310 in the wellbore. In certain configurations, a single transducer may serve as both the transmitter and receiver.

In some embodiments, the internals of intermediate communications nodes 380 may also be provided with a protective layer 340. The protective layer 340 resides internal to the wall 330 and provides an additional thin layer of protection for the electronics. This protective layer provides additional mechanical durability and moisture isolation. The intermediate communications nodes 380 may also be fluid sealed with the housing 386 to protect the internal electronics. One form of protection for the internal electronics is available using a potting material.

In some embodiments, the intermediate communications nodes 380 may also optionally include a shoe 342. More specifically, the intermediate communications nodes 380 may include a pair of shoes 342 disposed at opposing ends of the wall 330. Each of the shoes 342 provides a beveled face that helps prevent the node 380 from hanging up on an external tubular body or the surrounding earth formation, as the case may be, during run-in or pull-out.

Figure 5:
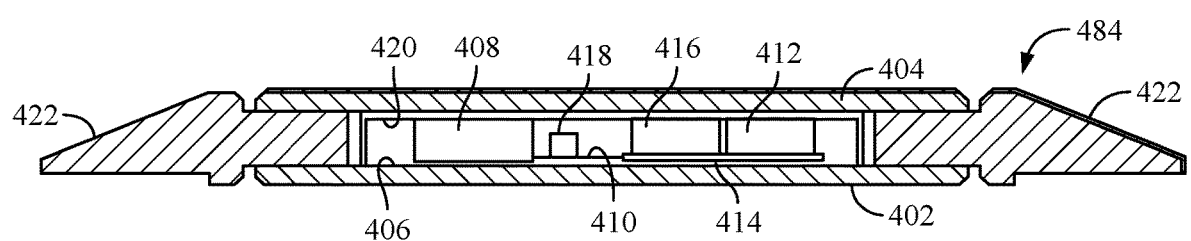
FIG. 5 is a cross-sectional view of an illustrative embodiment of a sensor communications node having a sensor positioned within the sensor communications node. The view is taken along the longitudinal axis of the sensor communications node.

FIG. 5 provides a cross-sectional view of a sensor communications node 484. The sensor communications node 484 is intended to represent the sensor communications node 184 of FIG. 1, in one embodiment, and the sensor communications nodes 284 of FIG. 2, in another embodiment. The view is taken along the longitudinal axis of the sensor communications node 484. The sensor communications node 484 includes a housing 402. The housing 402 is structured and arranged to be attached to an outer wall of a tubular section, such as the tubular section 310 of FIG. 3. Where the tubular section is formed of a carbon steel, such as a casing or liner, the housing 402 is preferably fabricated from carbon steel. This metallurgical match avoids galvanic corrosion at the coupling.

The housing 402 is dimensioned to be strong enough to protect internal components and other electronics disposed within the interior region. In one aspect, the housing 402 has an outer wall 404 that may be about 0.2 inches (0.51 cm) in thickness. An optional pair of shoes 422 may be disposed at opposing ends of the wall 404. Each of the shoes 422 may be shaped to provide a beveled face to help prevent the sensor communications node 484 from hanging up on an external tubular body or the surrounding earth formation, as the case may be, during run-in or pull-out. A cavity 406 houses the electronics, including, by way of example and not of limitation, a power source 408, a power supply wire 410, and a circuit board 414. The circuit board 414 will preferably include a micro-processor or electronics module that processes acoustic signals. A first electro-acoustic transducer 416 and a second electro-acoustic transducer 412 are provided to convert acoustical energy to electrical energy (or vice-versa) and are coupled with outer wall 404 on the side attached to the tubular body. The first electro-acoustic transducer 416 is in electrical communication with at least one sensor 418, possibly through a shared connection to a micro-processor on circuit board 414, which may be the at least one sensor 178 of FIG. 1, in one embodiment. It is noted that in FIG. 5, at least one sensor 418 resides within the housing 402 of the sensor communications node 484. In certain configurations, a single transducer may serve as both the transmitter and receiver. A protective layer 420 resides internal to the wall 404 and provides an additional thin layer of protection for the electronics. This protective layer provides additional mechanical durability and moisture isolation.

Figure 6:
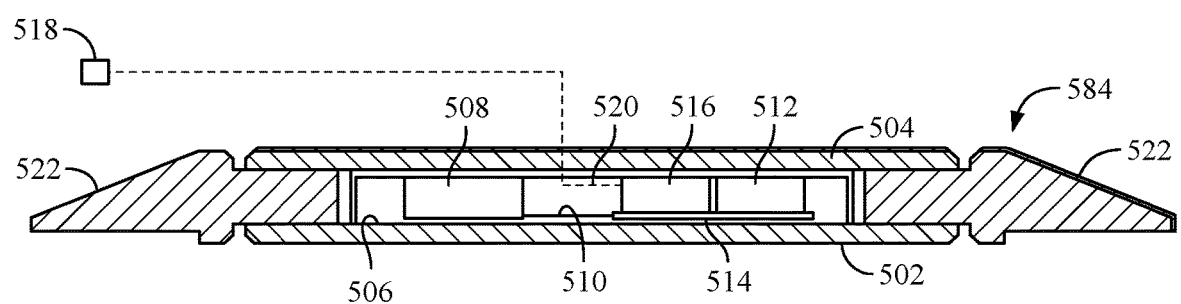
FIG. 6 is another cross-sectional view of an illustrative embodiment of a sensor communications node having a sensor positioned along the wellbore external to the sensor communications node. The view is again taken along the longitudinal axis of the sensor communications node.

Referring now to FIG. 6, an alternate embodiment is presented wherein an at least one sensor 518 is shown to reside external to a sensor communications node 584, such as above or below the sensor communications node 584 along the wellbore. In FIG. 6, the sensor communications node 584 is also intended to represent the sensor communications node 184 of FIG. 1, in one embodiment, and the sensor communications nodes 284 of FIG. 2, in another embodiment. The sensor communications node 584 includes a housing 502, which is structured and arranged to be attached to an outer wall of a tubular section, such as the tubular section 310 of FIG. 3.

In one aspect, the housing 502 has an outer wall 504 that may be about 0.2 inches (0.51 cm) in thickness. An optional pair of beveled shoes 522 may be disposed at opposing ends of the wall 504 as described in previous embodiments. A cavity 506, lined with a protective layer 520, houses the electronics, including, by way of example and not of limitation, a power source 508, a power supply wire 510, and a circuit board 514. The circuit board 514 will preferably include a micro-processor or electronics module that processes acoustic signals. A first electro-acoustic transducer 516 and a second electro-acoustic transducer 512 are provided to convert acoustical energy to electrical energy (or vice-versa) and are coupled with outer wall 504 on the side attached to the tubular body. The electro-acoustic transducer 516 is in electrical communication with at least one sensor 518. A dashed line is provided showing an extended connection between the at least one sensor 518 and the electro-acoustic transducer 516. In certain configurations, a single transducer may serve as both the transmitter and receiver.

In operation, the sensor communications node 584 is in electrical communication with the (one or more) sensors. This may be by means of a wire, or by means of wireless communication such as infrared or radio waves. The sensor communications node 584 is configured to receive signals from the sensors.

The sensor communications node 584 transmits signals from the sensors as acoustic waves. The acoustic waves can be at a frequency band of about 50 kHz and 1 MHz, from about 50 kHz to about 500 kHz, from about 60 kHz to about 200 kHz, from about 65 kHz to about 175 kHz, from about 70 kHz to about 300 kHz, from about 75 kHz to about 150 kHz, from about 80 kHz to about 140 kHz, from about 85 kHz to about 135 kHz, from about 90 kHz to about 130 kHz, or from about 100 kHz to about 125 kHz, or about 100 kHz. The signals are received by an intermediate communications node, such as intermediate communications node 380 of FIG. 4. That intermediate communications node 380, in turn, will relay the signal on to another intermediate communications node so that acoustic waves indicative of the downhole condition are sent from node-to-node. A last intermediate communications node 380 transmits the signals to the topside node, such as topside node 182 of FIG. 1, or topside node 282 of FIG. 2.

As indicated above, one embodiment of the intermediate communications nodes described herein is of a novel dual transducer design. The design consists of two transducers: one serving as a transmitter and another serving as a receiver. Though a single electronic board is used to operate the transmitter and receiver, separate electronic circuits are employed to optimize the performance of transmission and receiving respectively. The dual transducer design provides optimal overall performance as an intermediate communication node and offers extended range.

In addition to improved communication performance, the dual transducer design may provide such advanced benefits as: a) the receiver may be designed and used as an energy harvesting device to harvest the vibration from the transmitter when transmitting; b) the transmitter and receiver may be designed and used as a pair of active sensing devices for measurement of physical parameters of interest, such as material surrounding the node, flow velocity, casing corrosion, or the like; c) the transmitter and receiver pair may be designed and used to provide advanced diagnostic information.

Figure 7A:
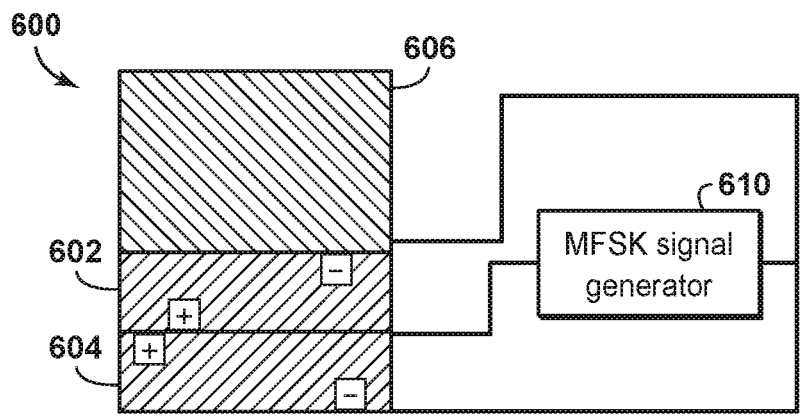
FIG. 7A is a schematic view of a transmitter having multiple-disks for use in an intermediate communications node, according to the present disclosure.

Referring now to FIG. 7A, the transmitter 600 may be designed to have multiple disks, 602, 604, . . . , with electrodes connected in parallel, as shown. A single voltage may be applied equally to all disks 602, 604, . . . via MFSK signal generator 610. Based on piezo transducer theory, the mechanical vibration output of such a multi disk stack is given by summation of the output of each disk, 602, 604, . . . . The amplitude of vibration displacement of each disk is approximately given by:

$$Y_{disk}=d_p V_{t0}$$

where $d_p$ is the piezo charge constant. The total amplitude of the displacement of parallel multi-disk stack is approximately:

$$Y_{total}=nY_{disk}=nd_p V_{t0}$$

where n is the number of disks. Clearly, the mechanical output of the piezo stack can be increased by increasing the number of disks while applying the same voltage. For the same output required, more disks allow using a lower driving voltage.

Figure 7B:
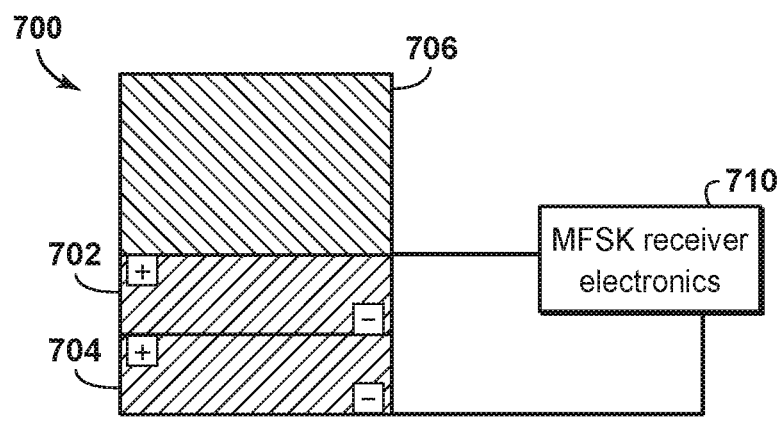
FIG. 7B is a schematic view of a receiver having multiple-disks for use in an intermediate communications node, according to the present disclosure.

Referring now to FIG. 7B, the receiver 700 is designed to have multiple-disks 702, 704, . . . , with electrodes connected in series or a single thicker disk. The voltage output to MFSK receiver electronics 710 of a single disk of thickness h, when subjected to a vibration force with an amplitude, $F_0$, is given approximately by the following relation:

$$V_{disk}=g_p h F_0/A$$

where $g_p$ is the piezo voltage constant, and A is the disk surface area. The overall voltage output of a series of multiple disks is approximately:

$$V_{r0}=mV_{disk}=mg_p h F_0/A$$

where m is the number of disks. In theory, a thick disk with thickness of L=m h will perform equally well as multiple disks in series. Therefore, we could increase the thickness of a single disk or number of disks of the same thickness to boost the receiver voltage output. With higher voltage output at a given vibration signal, the receiver sensitivity increases, which will improve detection accuracy or increase the communication range.

In the preferred embodiment, the piezo transmit and receive stacks will be fitted with an end mass 606 and 706, respectively, to enhance transmission output or receiver sensitivity. The end mass provides properly timed reflections to improve the piezo performance. With separate transmit and receive transducers, the end mass lengths can be individually selected to optimize overall acoustic performance. Additional performance customization can be achieved with combined collective adjustments to both the electrical impedance matching circuits and the end mass adjustments. With separate transmit and receive transducers, four independent adjustments are available compared to two with a single transmit/receive transducer. Performance parameters such as power consumption, signal to noise ratio, and bandwidth can be adjusted to improve telemetry and battery life.

In some embodiments, the electronic circuit for the transmitter 600 and for the receiver 700 could be configured as separate entities to optimize their performance. For example, different amount of inductance could be used for transmitter 600 and receiver 700. Cross-talk and receiver noise may also be reduced. Laboratory data has shown significant improvement with the dual transducer designs disclosed herein over a single transducer design, the benefits being as much as 20 dB or better. This improvement is based on comparing the dual transducer design with the transducer shown in FIG. 7A used as the sole transducer. Most of the improvement is attributable to flexibility using separate receive and transmit circuitry.

The disclosed aspects include a method by which sensor devices accessible via an acoustic wireless network can provide data equivalent in analytical value to a substantially larger and more comprehensive dataset, while simultaneously operating within a low energy envelope conducive to long operational life using small, limited capacity power sources compatible with placement in space-constrained downhole locations subject to extreme temperature and pressure.

Some research has occurred in recent years with respect to efficient querying of distributed sensor networks, but such research generally assumes a 2- or 3-dimensional network in which each node can communicate with any other within spherical range and there are multiple distinct paths between any two such nodes. The research also assumes the existence of always-available (or nearly so) radio communication and focuses on responding to ad hoc queries from a particular client. In contrast, a downhole acoustic wireless network installed on a tubular (such as a hydrocarbon well or an injection well) generally offers only one-dimensional networking and a single path between any two nodes. Because the nodes exist in an unresponsive sleep state most of the time, each ad hoc query from a receiver (such as receiver 190) or a topside node (such as topside communications node 182) has a high probability of failing by not reaching the necessary downhole node in a timely manner (if at all).

Figure 8:
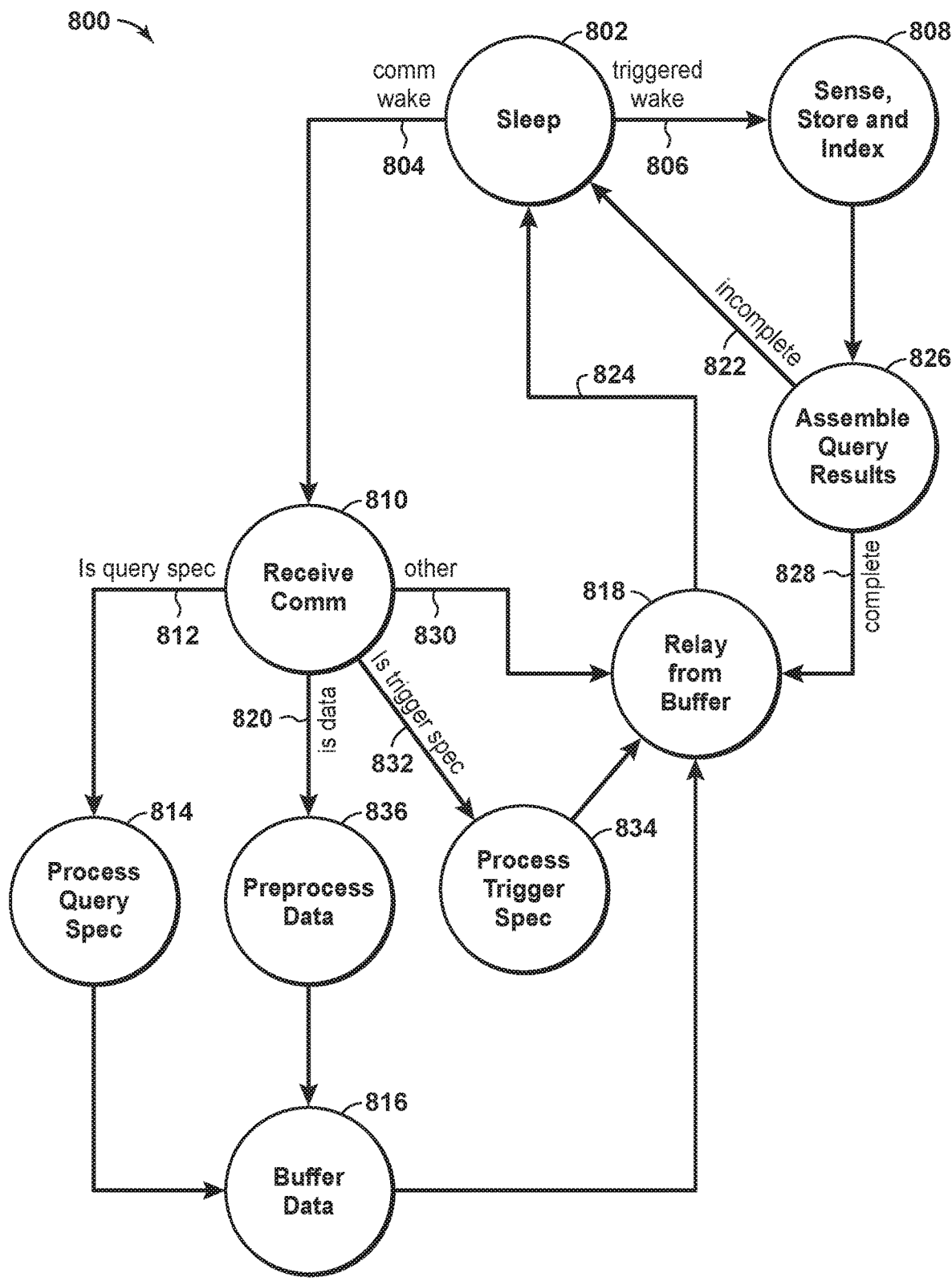
FIG. 8 is a schematic diagram showing a state diagram usable with a node in a wireless communication network according to disclosed aspects.

FIG. 8 shows a state transition diagram 800 for a device comprising a node in a wireless network according to one possible aspect addressing the above issues. The device usually sleeps, as shown by sleep state 802, but the device wakes periodically to check for incoming communication (state change line 804) and wakes in response to "trigger" conditions (state change line 806) that cause it to take sensor readings (state 808). Non-limiting examples of triggers might include: a sensor value exceeding or falling below a particular range or a threshold value; a sensor value staying within a particular range for a period of time; and/or a one-time or recurring timed interval. The specific triggers active in a device will determine which sensor values the device will acquire, and under what circumstances it will acquire them. As used herein, a "sleep state" may include a device state in which a device is not operating (i.e., consuming no power), and/or device states in which a device is operating at a very low power level compared to a normal operating state. Such very low power level may be calculated based on instantaneous power usage or a time-based average power usage. A very low power level may be less than 10%, or less than 5%, or less than 2%, or less than 1%, or less than 0.1%, or less than 0.01% of the power level of a normal operating state.

Once sensor data is acquired 808, the device will assemble query results if possible (state 826) and either return (via state change line 822) to the sleep state 802 if query results are still incomplete, or proceed (state change line 828) to "push" query results closer to topside (state 818) if query results are complete (in other words, one or more queries is fully satisfied). If an incoming communication is received by the device (state 810), it is determined whether the communication is a query specification (or query spec), a data packet, a trigger specification (or trigger spec), or some other communication that may not be relevant to the device but may be relevant to a different device.

To retrieve sensor data, a receiver or topside device ("client") issues one or more queries to the downhole network. A given device receives the query spec (state change line 812), stores each relevant query spec and, at state 814, assembles (but not yet transmitting) corresponding data until the query is fully satisfied. The data may be manipulated, filtered, transformed, summarized, tagged with node-specific identifier, or otherwise processed (collectively, "processed"), to thereby generate a processed dataset. The data and/or the processed dataset is buffered and stored at state 816. This allows the device to sleep and otherwise conserve energy while servicing the query spec. In some cases, data and/or processed datasets received from other devices may be combined with local data and/or processed datasets to be further processed at state 836. In other words, the local processing of data according to the disclosed aspects may incorporate data already relayed from other devices. As a non-limiting example, several sensing devices could contribute to a result set already on its way to the surface. The query could, in such a case, specify something that may naturally come from a group of devices, such as temperatures from a range of depths. In any event, the device may apply data filtering, transformations such as moving average, summarizations, or other processing locally, thereby displacing a portion of analysis from topside to the sensor devices themselves in lieu of the usual practice of returning all necessary raw data to the client for processing. This downhole analysis yields a substantially smaller result set in most cases and saves energy due to a reduced number of transmissions.

In various aspects of the disclosure, the data is processed at a device according to instructions provided in one or more trigger specs and/or query specs. Such instructions are considered a "variable instruction set" because of the ability to change how the data is processed by varying instructions in a trigger spec and/or query spec.

To determine the sensor data available for a query spec, a receiver or topside device ("client") issues one or more trigger specs to the downhole network. A given sensor device receives the trigger spec (state change line 832) and, at state 834, stores each relevant trigger spec and updates the "trigger" conditions that cause the sensor device to take sensor readings. As non-limiting examples: the trigger specs may depend solely on sensor values from the local sensor device; or the trigger specs may depend at least in part on sensor data from at least one other sensor device; or the trigger specs may not depend on sensor data from any sensor device.

Since downhole sensor devices may have intermittent availability (due to sleep, acoustic channel saturation, production noise, and many other causes), each device "pushes" query results closer to topside (at state 818) as available peers exist to do so. Data received from other devices (via state change line 820) is preprocessed as necessary (at state 836) then stored at state 816 and relayed at state 818, similar to received queries. In some cases, communications received from other devices may be immediately (via state change line 830) relayed at state 818 while bypassing the typical processing and/or storage. Once sensor data is relayed at state 818, the device will return (via state change line 824) to the sleep state 802. This behavior contrasts with the ad hoc approach of "pulling" sensor data in response to the immediate query, and likewise contrasts with the conventional "polling" approach in which the client checks the status of one or more devices on a scheduled basis or on an ad hoc basis. Note that pushing query spec results also allows for positioning of results near the top of the downhole network even if no topside device is present (a "headless" network) to make later retrieval of results faster and more energy efficient, and to reduce the possibility that results become irretrievable due to device and/or network failure.

FIG. 9 shows examples of a hypothetical trigger spec 902 and first and second hypothetical query specs 904, 906. Note that all are device independent, identifying target devices via functional aspects of the network (such as downhole depth) rather than specific device IDs or addresses. This simplifies operation and allows for consistent queries across an entire field of downhole network installations regardless of the specific sensor device configuration in each well. Hypothetical trigger spec 902 instructs all devices at 600-1,200 foot depths downhole to save a temperature reading in their log every ten minutes. First hypothetical query spec 904 requests temperatures from all devices at 600-1,200 foot depths downhole. Each device should return the ten-point moving average of every twelfth temperature from the $96^{th}$ through the $600^{th}$ temperature in the log. Second hypothetical query spec 906 requests temperatures from all devices at 600-1,200 foot depths downhole. Each device should return the ten-point moving average of every twelfth temperature from the log, but only when it exceeds the previous moving average value by more than twenty percent. Other types of inputs, such as pressure, acoustic energies, and the like, may be recorded at one or more devices and processed as disclosed herein.

In one embodiment, a topside receiver can synchronize the sensor devices in multiple downhole networks such that a single trigger spec or query spec can result in temporal data from all networks that corresponds to the same moments in time across all networks.

In other embodiments, sensor devices can compress query spec results to save additional energy as compared to transmitting the same query spec results in uncompressed form. In one such embodiment, two or more sensor devices provide portions of the query spec results such that each sensor device compresses its contribution to the query spec results but does so with the benefit of a compression dictionary, sensor value deltas, or other metadata from at least one other sensor device. In this form of collaborative compression, no single device has the entire result set, but the devices share metadata (i.e., information about the nature of the data each device is holding) to improve the quality of the overall compressed result set. As a non-limiting example: if the sensed temperatures across a group of devices were between 82° C. and 85° C., the devices could return the temperatures themselves, with each value requiring eight bits of data to transmit; however, according to the disclosed embodiments, the first value in the result set could be 82° C., which would establish a result set baseline, and all subsequent transmitted values would be 0-3 depending on how much each measured temperature exceeds the baseline. These subsequent transmitted values of 0-3 require only two bits of data to transmit, which is roughly 75% smaller than simply returning the actual temperatures. The devices can only achieve such compression if some degree of metadata is shared between the devices prior to each device compressing its own data.

The disclosed aspects provide a communications network and a method of communicating over such a communications network. Such a communications network may include a plurality of devices, which may comprise the nodes in a wireless communications network as disclosed herein. These devices are positioned to communicate with other devices in the network and may include a receiver and a transmitter. The devices are arranged to form a substantially linear network topology as previously discussed. Some, if not all, of the devices include one or more sensors such as a pressure sensor, a flow meter, a fluid flow measurement device, a temperature sensor, a chemical composition or pH sensor, a formation density sensor, a fluid identification sensor, a strain gauge, a pressure sensor, a resistivity sensor, a vibration sensor, a microphone, or a geo-phone. Devices with sensors include some means of recording inputs from the respective sensors as well as information received from other devices. Each device has a processor that processes, according to a variable instruction set residing in the device, recorded values from the sensors associated with the respective device and/or other devices. The variable instruction set may be changed by commands from other devices, or from a transmitter external to the network, such as a topside transceiver. For example, patterns in the sensor data from one or more devices may be recognized or detected (such as a regular cycling of temperatures or flow rates, or temperature gradient greater than a predetermined amount), and based on such pattern detection the variable instruction set for one or more devices may be modified. The modifications to the variable instruction set(s) may include executing other data requests from any device in the network, instructing one or more devices to relay or to not relay recorded information or secondary data to other devices, and/or take other local or remote actions. In this manner, secondary or tertiary measurement data or other derived quantities may be generated and transmitted through the network. Such secondary data or derived quantities may include a ratio, calculated metric, or some sort of a derivative or integrated value (such as mass flow rate, temperature change over time, etc.) obtained from sensor data, such as mass flow rate. The local combining of this data results in less power required to transmit necessary information along the network. As an example, data received at a given device in a wellbore may look at its local temperature and the 5 temperatures lower in well that have been passed to the given device. Temperature data would only be relayed up-well if it matches a certain gradient, or if a continuity occurs, or if there is a single high temperature (indicating high flow or a leak). In this way, network bandwidth is saved, data containing more information is relayed, and thus data compression ratios can be extremely high, in an effective compression fashion.

Devices without sensors may also be included. These sensor-less devices may be specifically dedicated to processing (e.g., performing calculations on) sensor data or processed data from other devices. The sensor-less devices may be interspersed on the network such that multiple sensor data or processed data from sensor-included devices only need to be transmitted a short distance along the network before being recorded and processed to a single data message at the sensor-less device. Additionally, devices (with or without sensors) may be programmed to complete at least one sleep cycle (or other low-power cycle) between recording a sensor value and combining the sensor value with a sensor value recorded by another device. The devices may also be programmed to complete at least one sleep cycle between recording a sensor value and transmitting that sensor value to another device in the network.

The disclosed combination of small, low power sensor devices capable of placement in space-constrained locations and operation in extreme temperature and pressure, with long operational life, while supplying sensor data and/or processed data equivalent in analytical value to a substantially larger and more comprehensive data set, provides many advantages over known wireless communication techniques, especially in the context of downhole acoustic wireless networks or guided wave telemetry. For example, device-independent queries allow use across and/or throughout a production field regardless of configuration specifics for each well. The disclosed aspects support the autonomous push of query results for unattended or headless network operation. The disclosed aspects can query sensor devices despite intermittent availability. The disclosed aspects can synchronize temporal sensor data across multiple downhole networks. The disclosed aspects permit energy-efficient use of a linear network. Furthermore, the disclosed aspects provide longer sensor device operational life, ability to instrument space-constrained locations (therefore a greater proportion of the downhole environment), increased analytical value of retrieved sensor data, significantly reduced operational expense due to unattended or headless operation, and more reliable indication of anomalous downhole condition (via push strategy proactively moving query results to topside), among others.

Aspects of the disclosure provide a method of communicating using a downhole wireless network using a plurality of sensors. It is within the scope of the disclosure to employ the wireless network in other environments. For example, a pipeline may also exhibit similar acoustic aspects as a wellbore, and a sensor network as disclosed herein may be particularly effective to transmit data bi-directionally along the pipeline. Additionally, aspects of the disclosure may be implemented with types of wireless networks other than acoustic networks. Lastly, aspects of the disclosure are described as being used advantageously for downhole or pipeline sensor data collection, processing, and transmission, but may also be used to communicate with and control pipeline tools and other well control functions.

Figure 10:
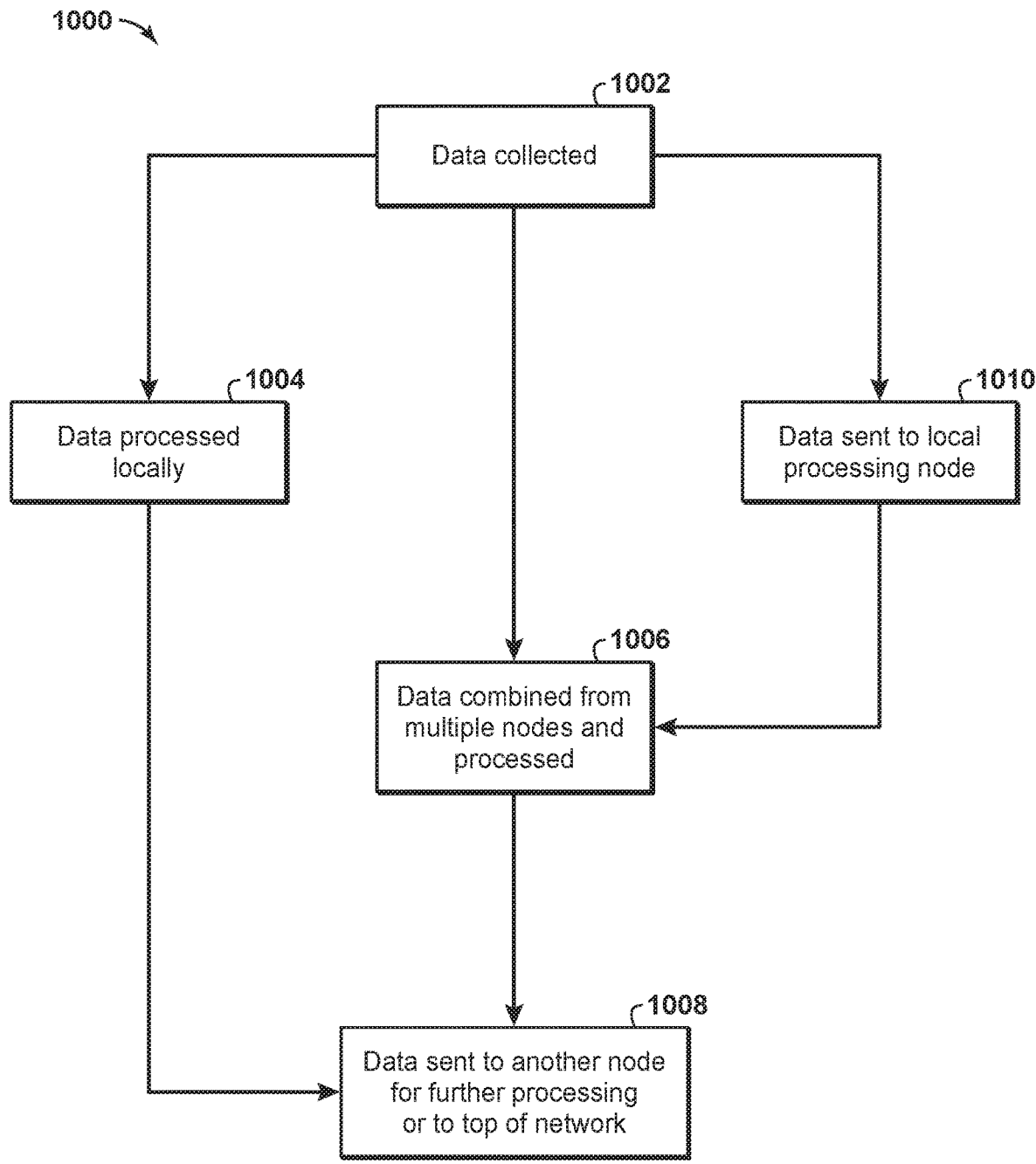
FIG. 10 is a flowchart of an exemplary method of communication in a linear downhole acoustic wireless network, according to disclosed aspects.

FIG. 10 is a flowchart showing a method 1000 of communicating in a wireless network according to disclosed aspects. The wireless network may have a substantially linear topology. At block 1002 data from one or more sensors associated with a communications node or device is collected and either processed locally at the node (block 1004) or combined with sensor data from at least one other node and processed locally at the first node (block 1006). Locally processed data may then be sent to another node in the wireless network for further processing, or may be directed toward an end of the network (block 1008). Alternatively, data collected in block 1002 may be sent to a local processing node or sensor-less device as previously described herein (block 1010), where data from multiple nodes may be combined and processed as described with respect to block 1006. Each node or device is maintained in a sleep state unless instructions are received to record values, process the recorded values, and/or transmit to another node or device, and each node or device returns to the sleep state when the instructions are fulfilled.

FIG. 11 is a flowchart showing a method 1100 of communication in a wireless network having a plurality of nodes including a first node, according to one possible aspect of the disclosure. At block 1102, each of the plurality of nodes is maintained in a sleep state. At block 1104, if a trigger event occurs at the first node, data relevant to the trigger event is sensed and/or stored and/or indexed at the first node. At block 1106, if a query applicable to the first node is received by the first node, the query at the first node is processed to produce query-based information. At block 1108, the query-based information is stored at the first node until the processing of the query is complete. At block 1110, the query-based information is transmitted to another node in the network. At block 1112, if the query may have applicability to a node other than the first node, the query is transmitted to another node in the network. At block 1114, if data is received by the first node, it is determined whether the data is needed to process a query applicable to the first node. At block 1116, if the data is not needed to process the query the data may be transmitted to another of the plurality of nodes. At block 1118, the first node is turned to the sleep state when the query-based information or the data is transmitted.

FIG. 12 is a flowchart showing a method 1200 of communicating in a wireless network according to another possible aspect of the disclosure. At block 1202 a plurality of devices are positioned such that each of the plurality of devices communicates with one or more other of the plurality of devices. At least some of the plurality of devices include one or more sensors. At block 1204, at one of the devices, values are recorded from the one or more sensors associated therewith. At block 1206, at least some of the devices, one or more recorded values from the one or more sensors associated with said each device, and/or a sensor associated with at least one other device, are processed in accordance with a variable instruction set, to thereby generate a processed dataset. At block 1208, at each device, at least one of recorded values, a processed dataset associated with another of the devices, or a revision to the variable instruction set receiving, are received from another of the devices. At block 1210, at each device, at least one of the one or more recorded values, and one or more processed datasets, are transmitted to another of the plurality of devices. At block 1212, each device is maintained in a sleep state unless instructions are received to record values, process the recorded values, and/or transmit to another device, and each device returns to the sleep state when the instructions are fulfilled.

As may be appreciated, the blocks of FIGS. 10-12 may be omitted, repeated, performed in a different order, or augmented with additional steps not shown. Some steps may be performed sequentially, while others may be executed simultaneously or concurrently in parallel. In addition, the methods described in any of FIGS. 10-12 may be used within a wellbore or along one or more tubular members, such as along a subsea conduit and/or along a pipeline, to enhance associated operations. As a specific example, the wireless network may be used along midstream pipelines and storage tanks, and/or downstream refinery and distribution operations.

The disclosed communications network provides an advantage over wired downhole communications systems in that it is robust. Each network element is configured to possess temporal, spatial, and chemical pattern recognition, thereby reducing the possibility of a single point failure (such as the break of a communications wire). Such pattern recognition, due to the distributed processors at each device or node and the ability to modify the variable instruction set at each device, permits the disclosed communications network to provide and support high quality, reliable operational decisions. Wired systems may not need distributed, or local, computational power at the node level as disclosed herein. The local computational power is most advantageous for wireless networks because more energy is saved (via transmissions) than it costs.

INDUSTRIAL APPLICABILITY

The apparatus and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

While the present invention has been described and illustrated by reference to particular embodiments, those of ordinary skill in the art will appreciate that the invention lends itself to variations not necessarily illustrated herein. For this reason, reference should be made solely to the appended claims for purposes of determining the true scope of the invention.

What is claimed is:

1. A wireless communications network, comprising:
a plurality of devices positioned to communicate with one or more other of the plurality of devices, each of at least one of the plurality of devices including one or more sensors and a means to record values from the one or more sensors, each of the plurality of devices forming a node in the wireless communications network;
at least some of the plurality of devices having a processor configured to process one or more recorded values from the one or more sensors associated with said each device, and/or
a sensor associated with at least one other device, in accordance with a variable instruction set, to thereby generate a processed dataset;
each of the plurality of devices including a receiver configured to receive, from another of the plurality of devices, at least one of recorded values, a processed dataset associated with another of the plurality of devices, or a revision to the variable instruction set; and
each of the plurality of devices including a transmitter configured to transmit at least one of
the one or more recorded values, and
one or more processed datasets,
to another of the plurality of devices;
wherein each of the plurality of devices are maintained in a sleep state unless instructions are received to record values, process the recorded values, and/or transmit to another of the plurality of devices, and wherein each of the plurality of devices return to the sleep state when the instructions are fulfilled; and
prior to transmitting the recorded values and/or the processed datasets by at least two of the plurality of devices, compressing, at said at least two of the plurality of devices, one or more of
the one or more recorded values, and
the one or more processed datasets,
according to a collaborative compression methodology.

2. The wireless communications network of claim 1, wherein at least one of the plurality of devices is a sensor-less device having no sensors associated therewith, wherein the at least one sensor-less device is positioned along a substantially linear topology to be within communication range of the one or more devices having sensors associated therewith;
wherein the at least one sensor-less device includes a processor configured to process one or more recorded values from
(i) one or more sensors associated with at least one other device of the plurality of devices, and/or
(ii) at least one other sensor-less device,
in accordance with a variable instruction set, to thereby generate a processed dataset associated with the at least one sensor-less device; and
wherein the at least one sensor-less device is configured to communicate at least one of
(iii) the one or more recorded values from the at least one other sensor-less device, and
(iv) the processed dataset associated with the at least one sensor-less device,
to another of the sensor-less devices.

3. The wireless communications network of claim 1, wherein the plurality of devices are arranged along one of a wellbore, a drill string, and a pipeline, and wherein at least one of the plurality of devices are affixed to a wall of a tubular body of the wellbore, drill string, or pipeline.

4. The wireless communications network of claim 3, wherein at least two of the plurality of devices comprise electro-acoustic communications devices, and wherein each of the electro-acoustic communications devices comprise:
a housing having a mounting face for mounting to a surface of the tubular body;
one or more piezoelectric elements positioned within the housing, the one or more piezoelectric elements collectively structured and arranged to
receive acoustic waves that propagate through the tubular body, and
transmit acoustic waves through the tubular body; and
a power source positioned within the housing.

5. The wireless communications network of claim 4, further comprising a topside device located adjacent to one end of the wireless network, the topside device being in communication with one or more of the plurality of devices.

6. The wireless communications network of claim 1, wherein the one or more sensors comprise at least one of a pressure sensor, a flow meter, a fluid flow measurement device, a temperature sensor, a chemical composition or pH sensor, a formation density sensor, a fluid identification sensor, a strain gauge, a pressure sensor, a resistivity sensor, a vibration sensor, a microphone, or a geo-phone.

7. The wireless communications network of claim 1, wherein the plurality of devices are positioned to create a substantially linear topology.

8. A method of communicating in a wireless network, comprising:
positioning a plurality of devices such that each of the plurality of devices communicates with one or more other of the plurality of devices, each of at least some of the plurality of devices including one or more sensors, each of the plurality of devices comprising a node in the wireless network;
at one of the plurality of devices, recording values from the one or more sensors associated therewith;
at least some of the plurality of devices, processing one or more recorded values from
the one or more sensors associated with said each device, and/or
a sensor associated with at least one other device,
in accordance with a variable instruction set, to thereby generate a processed dataset;
at each of the plurality of devices, receiving, from another of the plurality of devices, at least one of recorded values, a processed dataset associated with another of the plurality of devices, or a revision to the variable instruction set;
at each of the plurality of devices, transmitting at least one of
the one or more recorded values, and
one or more processed datasets,
to another of the plurality of devices;
wherein each of the plurality of devices are maintained in a sleep state unless instructions are received to record values, process the recorded values, and/or transmit to another of the plurality of devices, and wherein each of the plurality of devices return to the sleep state when the instructions are fulfilled; and
prior to transmitting the recorded values and/or the processed datasets by at least two of the plurality of devices, compressing, at said at least two of the plurality of devices, one or more of
the one or more recorded values, and
the one or more processed datasets,
according to a collaborative compression methodology.

9. The method of claim 8, wherein at least one of the plurality of devices is a sensor-less device having no sensors associated therewith, and further comprising:
positioning the at least one sensor-less device along a substantially linear topology to be within communication range of the one or more devices having sensors associated therewith;
processing one or more recorded values from
one or more sensors associated with at least one other device of the plurality of devices, and/or
at least one other sensor-less device,
in accordance with the variable instruction set, to thereby generate a processed dataset associated with the at least one sensor-less device; and
wherein the at least one sensor-less device is configured to communicate at least one of
the one or more recorded values from at least one other sensor-less device, and
the processed dataset associated with the at least one sensor-less device, to another of the sensor-less devices.

10. The method of claim 8, wherein the plurality of devices are arranged along one of a wellbore, a drill string, and a pipeline, and further comprising:
affixing at least one of the plurality of devices to a wall of a tubular body of the wellbore, drill string, or pipeline.

11. The method of claim 10, wherein at least two of the plurality of devices comprise electro-acoustic communications devices, and further comprising:
mounting each of the electro-acoustic communications devices to a surface of the tubular body;
in each of the electro-acoustic communications devices, receiving acoustic waves that propagate through the tubular body; and
in each of the electro-acoustic communications devices, transmitting acoustic waves through the tubular body.

12. The method of claim 11, wherein at least one of plurality of devices communicates with a topside node located adjacent one end of the wireless network.

13. The method of claim 12, further comprising:
at the topside node, storing signals transmitted from at least one of the plurality of devices; and
transmitting the stored signals to a receiver, separate from the plurality of devices, when a transmit command is transmitted from the receiver and received by the topside node.

14. The method of claim 8, further comprising:
sending a command from one of the plurality of devices to modify the variable instruction set in another of the plurality of devices.

15. The method of claim 8, further comprising:
at one of the plurality of devices, completing at least one sleep cycle between recording a sensor value and combining the sensor value with a sensor value recorded by another of the plurality of devices.

16. The method of claim 8, further comprising:
at one of the plurality of devices, completing at least one sleep cycle between recording a sensor value and transmitting the sensor value to another of the plurality of devices.

17. The method of claim 8, wherein the plurality of devices are arranged to create a substantially linear topology.

* * * * *